(12) United States Patent
Ido

(10) Patent No.: US 7,310,503 B2
(45) Date of Patent: Dec. 18, 2007

(54) DIVERSITY RECEPTION DEVICE AND DIVERSITY RECEPTION METHOD

(75) Inventor: Jun Ido, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 84 days.

(21) Appl. No.: 10/527,424

(22) PCT Filed: Oct. 27, 2003

(86) PCT No.: PCT/JP03/13727

§ 371 (c)(1),
(2), (4) Date: Mar. 11, 2005

(87) PCT Pub. No.: WO2004/038956

PCT Pub. Date: May 6, 2004

(65) Prior Publication Data

US 2006/0166634 A1    Jul. 27, 2006

(30) Foreign Application Priority Data

Oct. 28, 2002   (JP) .............................. 2002-312189

(51) Int. Cl.
  *H04B 7/08*       (2006.01)
(52) U.S. Cl. ..................... 455/140; 455/133; 455/137; 455/226.1; 455/273; 455/277.1; 455/277.2; 455/278.1; 455/226.2; 455/134; 455/135
(58) Field of Classification Search ........ 455/132–140, 455/226.1–226.3, 272–279.1, 296, 334–335, 455/131

See application file for complete search history.

(56) References Cited

U.S. PATENT DOCUMENTS

| 4,715,048 | A | * | 12/1987 | Masamura | .................. 375/347 |
| 5,031,193 | A | * | 7/1991 | Atkinson et al. | ........... 375/231 |
| 5,203,027 | A | * | 4/1993 | Nounin et al. | ............... 455/134 |
| 5,557,603 | A | * | 9/1996 | Barlett et al. | ................ 370/228 |
| 5,678,218 | A | * | 10/1997 | Daikoku | .................. 455/278.1 |
| 5,697,083 | A | * | 12/1997 | Sano | ........................ 455/276.1 |

(Continued)

FOREIGN PATENT DOCUMENTS

JP        4-222124 A    8/1992

(Continued)

OTHER PUBLICATIONS

Takashi Seki et al., "Performance of Diversity Reception for Digital Terrestrial Television Broadcasting", ITE Technical Report, vol. 25, No. 34, pp. 1-6, May 25, 2001.

*Primary Examiner*—Edan Orgad
*Assistant Examiner*—RuiMeng Hu
(74) *Attorney, Agent, or Firm*—Birch, Stewart, Kolasch & Birch, LLP

(57) ABSTRACT

The circuit size of a diversity receiver for an orthogonal frequency division multiplexing signal is reduced, and the diversity effect is increased, by providing a power ratio comparator that calculates a difference value as a ratio of powers derived from channel estimation results for subcarrier components received from two antennas (11), (21) and compares the calculated difference value with a predetermined threshold, and a selective/equal gain combining selector (33) that outputs one of the received demodulated signals when the comparison result indicates that the calculated difference value is greater than the threshold value.

17 Claims, 15 Drawing Sheets

U.S. PATENT DOCUMENTS

| | | | |
|---|---|---|---|
| 6,018,651 A * | 1/2000 | Bruckert et al. | 455/277.1 |
| 6,023,615 A * | 2/2000 | Bruckert et al. | 348/14.08 |
| 6,151,372 A * | 11/2000 | Yamamoto | 375/347 |
| 6,298,092 B1 * | 10/2001 | Heath et al. | 375/267 |
| 6,512,738 B1 | 1/2003 | Namekata et al. | |
| 6,600,933 B1 * | 7/2003 | Hiramatsu et al. | 455/561 |
| 6,603,961 B1 * | 8/2003 | Kuroda | 455/133 |
| 6,628,733 B1 * | 9/2003 | Tomiyoshi et al. | 375/347 |
| 6,940,932 B2 * | 9/2005 | Henriksson | 375/347 |
| 7,035,612 B2 * | 4/2006 | Kishimoto et al. | 455/277.1 |
| 7,155,192 B2 * | 12/2006 | Ghassemzadeh et al. | 455/277.1 |
| 2002/0168039 A1 * | 11/2002 | Miyanaga et al. | 375/347 |

FOREIGN PATENT DOCUMENTS

| | | |
|---|---|---|
| JP | 6-303171 A | 10/1994 |
| JP | 11-205208 A | 7/1999 |
| JP | 2000-151486 A | 5/2000 |
| JP | 2000-224139 A | 8/2000 |
| JP | 2001-156738 A | 6/2001 |

* cited by examiner

DIVERSITY RECEPTION DEVICE AND DIVERSITY RECEPTION METHOD

FIELD OF THE INVENTION

The present invention relates to a diversity receiver having a plurality of demodulation paths, and to its receiving method.

BACKGROUND ART

The diversity receivers found in the prior art first compare estimated received power values of the carrier waves of the received signals on each of two demodulation paths at each point in time, and select and output the received signal with the larger estimated value; this is generally known as selection diversity (also referred to below as the selection system or selective diversity). That is, of the two received signals at each point in time, they selectively output the received signal with the better reception conditions, and do not use the received signal with the inferior reception conditions. At each point in time, accordingly, they cannot obtain better receiving performance than the individual received power obtained from one of the received signals in the two demodulation paths.

To improve the receiving performance further, combining the two received signals has been contemplated.

A type of diversity receiver is known that employs a maximal ratio combining diversity system by providing circuitry that calculates a ratio of power levels (estimated power values) of a pair of received signals on a pair of demodulation paths (or demodulated signals obtained by demodulating the received signals), generates weighting coefficients according to the calculated power ratio, and multiplies the received signals by the weighting coefficients to create a weighted combination.

It is known, as shown in "Improvement of terrestrial digital TV broadcasting performance by diversity receiving" by Takashi Seki, et al., Technology Report from Image Information Media Academy, May 25, 2001, Vol. 25, No. 34, pp. 1 to 6, ROFT2001-54 (May, 2001), that a maximal ratio combining diversity receiver can not only mitigate multipath distortion, as do diversity receivers using the selection diversity system, but also improve transmission characteristics with respect to thermal noise, and can further improve the instantaneous carrier-to-noise ratio (also referred to simply as the CNR below).

Equal gain combining diversity receivers are another example of a diversity system in which a pair of received signals on a pair of demodulation paths are combined to improve receiving performance. Equal gain combining diversity always combines a pair of received signals with equal gain, so that regardless of the power levels (estimated power values) of the received signals on the pair of demodulation paths, the average value of the received signals on the demodulation paths is always output as the combined signal. It is known that equal gain combining diversity produces a larger diversity effect than selection diversity and a smaller diversity effect than maximal ratio combining diversity. By contrast, when the difference between the received signals on the pair of demodulation paths (or the demodulated signals obtained by demodulation of the received signals) or between the CNRs of the received signals increases, the receiving performance of equal gain combining diversity may fall below that of selection diversity.

Among conventional diversity receivers, selection diversity receivers, for example, can operate with small circuitry because they simply use one of the received signals on the pair of demodulation paths, but there has been a problem in that it is difficult to improve their receiving performance.

Although equal gain combining diversity receivers require only simple equalizers to be added and can accordingly operate with comparatively small circuitry, and although they can provide better reception than with selection diversity, there has been a problem in that their reception cannot be improved over that of maximal ratio combining diversity. There has also been a problem in that as the difference between the received signals on the pair of demodulation paths increases, the receiving performance of equal gain combining diversity receivers is degraded.

Maximal ratio combining diversity receivers can provide better receiving performance than selection or equal gain combining diversity receivers, but there has been a problem in that they require circuitry for generating weighting coefficients according to the (estimated) received signal power ratio and further multiplying the received signal powers by the weighting coefficients, resulting in larger circuit scale.

The present invention is intended to solve problems such as those above, and has the object of providing a diversity receiver with a small circuit scale in which the receiving performance can be improved to a level near that of a maximal ratio combining diversity receiver.

DISCLOSURE OF THE INVENTION

The diversity receiver of the present invention has: a plurality of demodulation paths for demodulating received signals and outputting demodulated signals; a power ratio comparator for calculating a power ratio from a first power corresponding to a first received signal on one of the demodulation paths and a second power corresponding to a second received signal on another one of the demodulation paths, and comparing the power ratio with a predetermined threshold value; a signal selector for selecting one of the demodulated signals output from the plurality of demodulation paths and outputting the selected demodulated signal; an equal-gain signal combiner for combining the demodulated signals output from the plurality of demodulation paths with predetermined gains, and outputting a combined demodulated signal; and a demodulated signal output unit for outputting one of the demodulated signals, either the selected demodulated signal or the combined demodulated signal, responsive to the result of the comparison in the power ratio comparator.

The diversity receiving method of the present invention adaptively switches between selection diversity and equal gain combining diversity for each subcarrier component according to power values of the received signals on the demodulation paths, so in comparison with conventional diversity receiving methods using only selection diversity or only equal gain combining diversity, it can provide a larger diversity effect and improved receiving performance, and a diversity receiver producing a large diversity effect can be implemented with less circuitry than when maximal ratio combining diversity is practiced.

BEST MODE OF PRACTICING THE INVENTION

Figure 1:
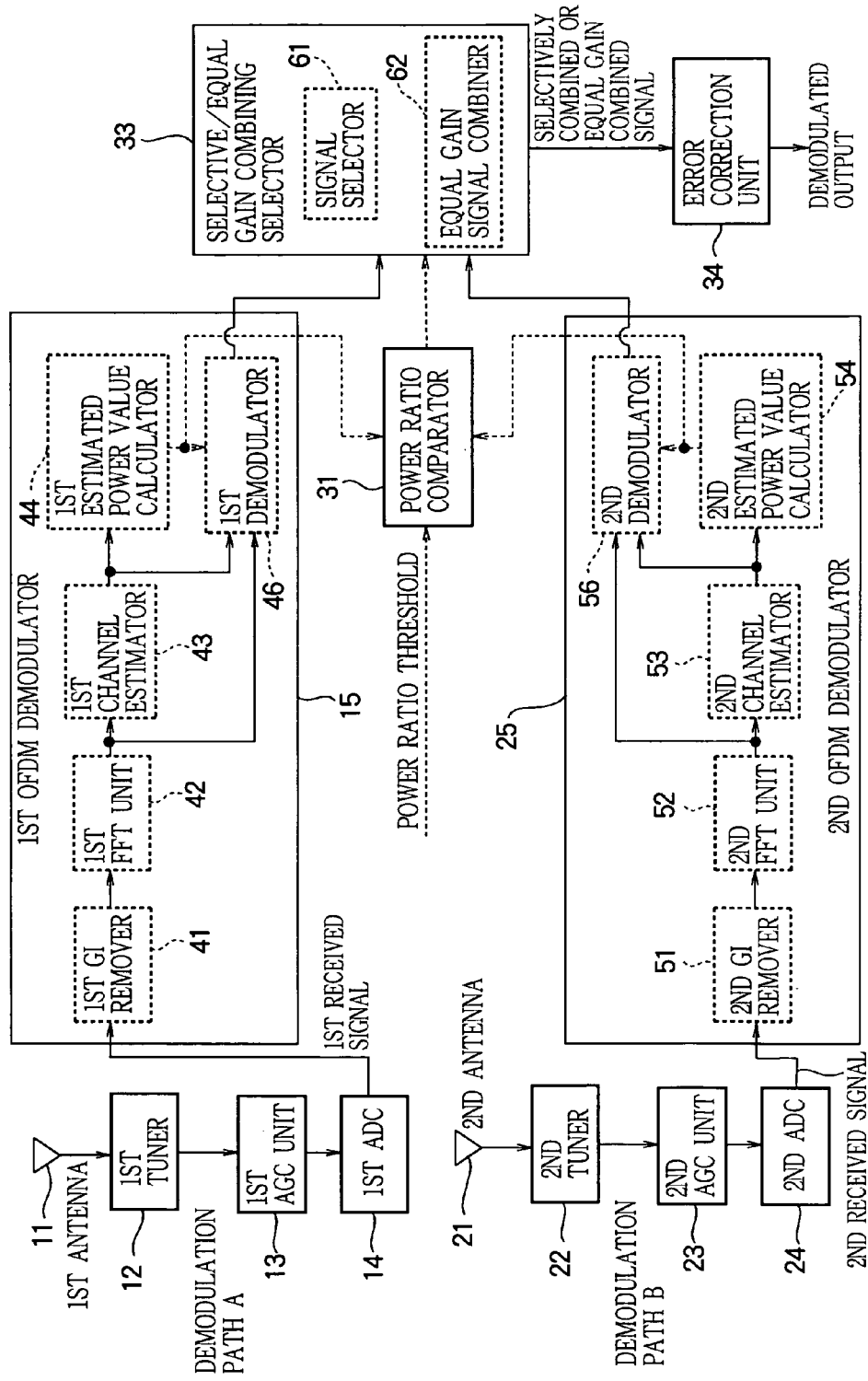
FIG. 1 is a block diagram illustrating a diversity receiver in a first embodiment of the invention.

In the following descriptions of the embodiments, the case in which an orthogonal frequency division multiplexing (OFDM) signal is received in the instant diversity receiver will be described. OFDM transmission technology and diversity technology will be described before the description of the embodiments.

OFDM transmission technology (for transmitting and receiving) transmits information modulated onto a multiplexed plurality of subcarriers having mutually orthogonal frequencies and performs the reverse process at the receiving end to demodulate the signal; practical use of this transmitting and receiving technology is advancing, particularly in the broadcasting and communication fields.

In OFDM transmission, the transmitter first assigns the data to be transmitted to a plurality of subcarriers, and modulates each subcarrier digitally by a system such as QPSK (Quadrature Phase Shift Keying), QAM (Quadrature Amplitude Modulation), or DQPSK (Differential Encoded Quadrature Phase Shift Keying). Additional information relating to transmission parameters and transmission control, and a continuous pilot carrier component modulated with known data, are modulated onto a particular subcarrier using DBPSK (Differential Binary Phase Shift Keying) or BPSK (Binary Phase Shift Keying); after these are multiplexed, the OFDM signal is converted to a desired frequency and transmitted.

More specifically, in transmission, the data to be transmitted are mapped onto the subcarriers according to the modulation system thereof, and an inverse discrete Fourier transform is performed. Next, after the inverse discrete Fourier transform, the last part of the signal is copied to the beginning of the signal. This part is referred to as the guard interval; this enables the signal to be received without symbol interference at the receiving end even if there is a delayed signal having a delay time equal to or less than the guard interval.

Because all of the subcarriers in the OFDM system possess mutual orthogonality, the transmitted data can be recovered correctly if the subcarrier frequencies are correctly recovered at the receiving end. When the subcarrier frequencies at the receiving end include error with respect to the actual frequencies, however, intercarrier interference occurs, the probability of incorrect recovery of the transmitted data increases, and transmission characteristics are degraded. Accordingly, the accuracy with which the subcarrier frequencies can be recovered at the receiving end is a critical issue in an OFDM system.

A demodulator that receives an OFDM signal orthogonally demodulates the complex digital OFDM signal that is generally input, converting its frequency to the baseband, removes the guard intervals to obtain a time-domain signal, and Fourier-transforms the time-domain signal to obtain a frequency-domain signal, which is then detected and thereby demodulated.

In an OFDM system, each subcarrier carries transmitted data mapped according to a modulation system such as QPSK or multilevel QAM; known pilot carrier signals are inserted among the subcarriers periodically in the frequency and time directions. In the Japanese terrestrial digital TV broadcasting system, for example, a scattered pilot is inserted periodically; the OFDM receiver estimates channel characteristics on the basis of the scattered pilot to demodulate the subcarriers.

Diversity technology uses a plurality of demodulation paths (at least two paths) as described above from respective antennas to respective OFDM demodulators, thereby obtaining higher receiving performance than when a single demodulation path is used. When signals are received in adverse transmission environments caused by multipath or Rayleigh-fading channels, diversity technology, by effecting spatial diversity, generally reduces the error rate after signal demodulation and improves the receiving performance.

FIRST EMBODIMENT

FIG. 1 is a block diagram illustrating the diversity receiver in the first embodiment.

As OFDM signal demodulation paths, the diversity receiver has two demodulation paths: demodulation path A and demodulation path B. Demodulation path A has a first antenna 11, a first tuner 12, a first AGC (Automatic Gain Control) unit 13, a first ADC (analog-to-digital converter) 14, and a first OFDM demodulator 15. Demodulation path B has a second antenna 21, a second tuner 22, a second AGC unit 23, a second ADC 24, and a second OFDM demodulator 25.

In the diversity receiver illustrated in FIG. 1, the first antenna 11 and second antenna 21 receive wireless signals that have been modulated for transmission. The first tuner 12 and second tuner 22 convert the frequency of the received wireless signals to a predetermined frequency band.

The first AGC unit 13 and second AGC unit 23 adjust the gain levels of the frequency-converted analog signals. The gain level adjustment performed by the first AGC unit 13 and second AGC unit 23 produces optimal signal levels in the first and second demodulators 46, 56 in the following stage. Adjustment of the gain by the AGC circuits 13, 23 is preferable because in general the signal power of the received signals input from the antennas 11, 21 varies due to, for example, the antenna gain and channel conditions.

The first ADC 14 and second ADC 24 convert the frequency-converted and gain-adjusted analog signals to digital signals, outputting a first received signal and a second received signal to the first OFDM demodulator 15 and second OFDM demodulator 25, respectively.

The first OFDM demodulator 15 and second OFDM demodulator 25 demodulate the first received signal and the second received signal and output respective digital demodulated signals.

Signals corresponding to power (referred to as estimated power $P_{es}$ below) in estimated channel values calculated for each subcarrier in the received signals on demodulation paths A and B are input from the first OFDM demodulator 15 and second OFDM demodulator 25 to a power ratio comparator 31.

The power ratio comparator 31 decides which of the estimated power values $P_{es}$ is larger: the estimated power value $P_{es\_A}$ of demodulation path A or the estimated power value $P_{es\_B}$ of demodulation path B. It also compares an estimated power ratio $P_{es\_R}$ obtained by dividing the larger of the two estimated power values $P_{es\_A}$ and $P_{es\_B}$ by the smaller of these values with a predetermined threshold (referred to in the first embodiment as the power ratio threshold) for each subcarrier, and outputs a signal indicating the result of the comparison to the selective/equal gain combining selector 33.

More specifically, if the estimated power ratio $P_{es\_R}$ is smaller than the power ratio threshold value, the power ratio comparator 31 outputs to the selective/equal gain combining selector 33 a signal indicating that a demodulated signal obtained by an equal-gain signal combiner 62, described later, will be output. On the other hand, if the estimated power ratio $P_{es\_R}$ is larger than the power ratio threshold, the power ratio comparator 31 outputs to the selective/equal gain combining selector 33 a signal indicating that the demodulated signal with the larger of the two estimated power values $P_{es\_A}$, $P_{es\_B}$ will be selected by the signal selector 61, described later.

In other words, the power ratio comparator 31 calculates the power ratio $P_{es\_R}$ from a first estimated power value which is a first power corresponding to the first received signal on demodulation path A and a second estimated value which is a second power corresponding to the second received signal on demodulation path B, and compares the power ratio $P_{es\_R}$ with a predetermined threshold value (power ratio threshold).

According to the signal received from the power ratio comparator 31, the selective/equal gain combining selector 33 decides whether to output a demodulated signal (hereinafter also referred to as a selected demodulated signal) that is obtained by selecting one of the two demodulated signals output from the first OFDM demodulator 15 and the second OFDM demodulator 25 (selection diversity) or a demodulated signal (hereinafter also referred to as a combined demodulated signal) that is obtained by combining both the demodulated signals with equal gain (equal gain combining diversity). Accordingly, in the diversity receiver according to the first embodiment, a resultant demodulated signal is output by the selective/equal gain combining selector 33. The selective/equal gain combining selector 33 thus functions as the demodulated signal output unit of the diversity receiver.

In other words, based on the output of the power ratio comparator 31, the selective/equal gain combining selector 33 outputs the single output from the first demodulator 46, the single output from the second demodulator 56, or a combined output obtained by combining the outputs from the first demodulator 46 and the second demodulator 56 with equal gain.

Accordingly, the selectively combined or equal gain combined signal output from the selective/equal gain combining selector 33 is a signal obtained by adaptively selecting either a demodulated signal obtained by selecting one of the demodulated signals corresponding to the first and second received signals for each subcarrier component or a demodulated signal that is combined with equal gain according to the estimated power ratio $P_{es\_R}$ of the received signals on demodulation paths A and B; the diversity effect of the two demodulation paths A and B reduces the error rate of the modulated signal.

The error correction unit 34 performs error correction on the selectively combined or equal-gain combined signal output from the selective/equal gain combining selector 33 and outputs the corrected demodulated signal.

Next, the internal structure of the first OFDM demodulator 15 and the second OFDM demodulator 25 will be described. GI removers 41, 51 are provided for eliminating guard intervals (GI's) in the first OFDM demodulator 15 and the second OFDM demodulator 25, respectively. The first GI remover 41 takes the first received signal as input and recovers the OFDM symbol timing to eliminate the guard intervals added to the first received signal; the second GI remover 51 takes the second received signal as input and recovers the OFDM symbol timing to eliminate the guard intervals added to the second received signal.

A first FFT unit 42 and second FFT unit 52 convert input time domain signals by the Fast Fourier Transform (referred to as FFT below) to output frequency domain signals. The frequency domain signals correspond to the subcarrier components of the first received signal and the second received signal.

Figure 2:
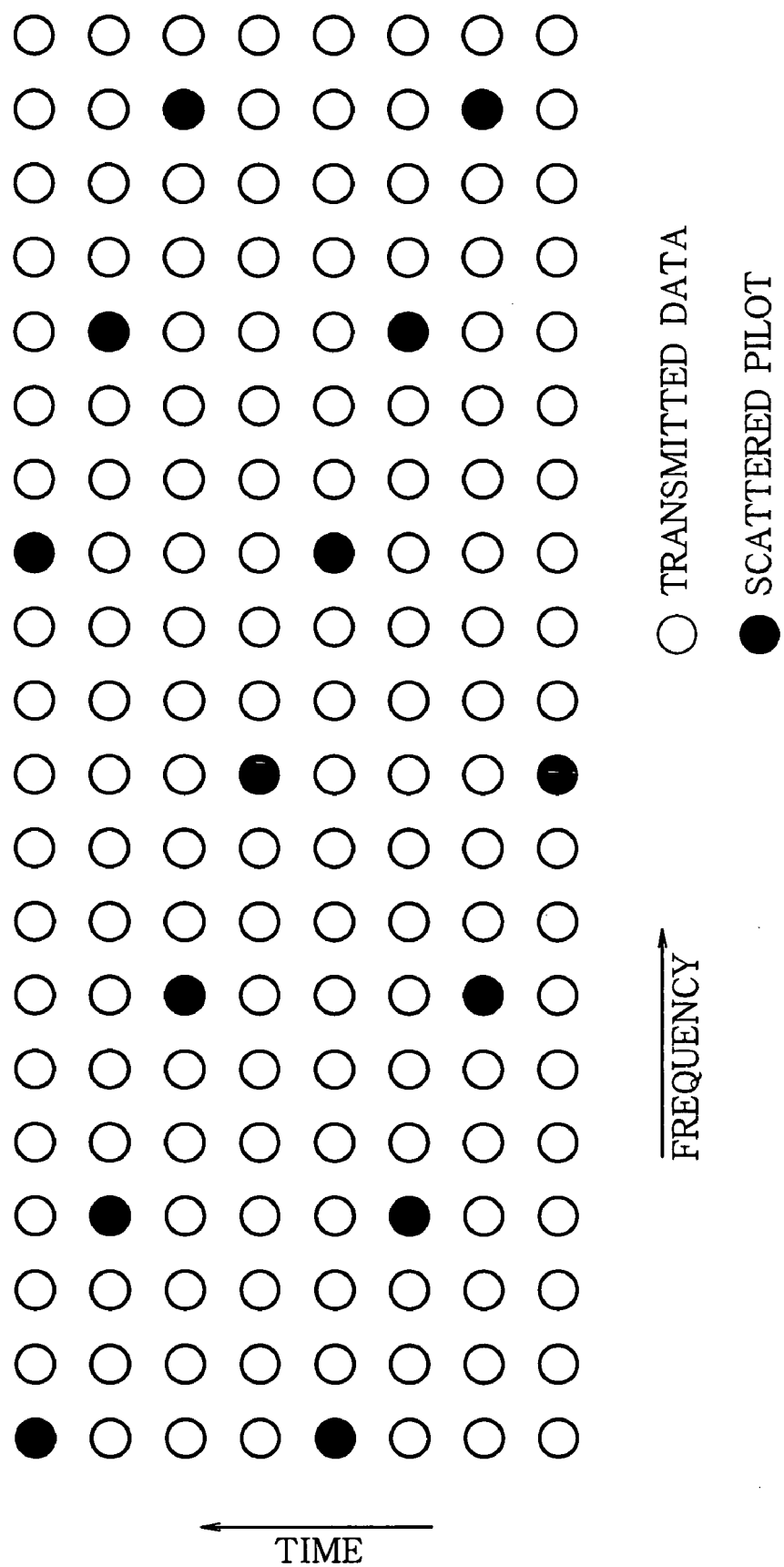
FIG. 2 is a drawing showing a scattered pilot, which is a known pilot subcarrier component inserted periodically among the Fourier-transformed OFDM subcarriers.

A first channel estimator 43 and second channel estimator 53 extract pilot carrier components included in the frequency domain signals output from the first FFT unit 42 and second FFT unit 52 to estimate the channel characteristics of the signals received from antennas 11 and 21. For example, in the Japanese terrestrial wave digital TV broadcasting system, scattered pilots are inserted periodically as shown in FIG. 2, and are used by TV receivers to estimate channel characteristics for demodulation of the carrier waves. A general channel estimation method, for example, divides each of the extracted scattered pilots by its known data and interpolates the results in the time and frequency directions, thereby enabling estimation of the channel characteristics for each subcarrier component.

A first estimated power value calculator 44 and second estimated power value calculator 54 calculate the estimated power $P_{es\_A}$, $P_{es\_B}$ on the channels estimated for each subcarrier in the channel estimators 43, 53, and output the results to a first demodulator 46, a second demodulator 56, and the power ratio comparator 31. As described above, in this embodiment, since the received signals are OFDM signals modulated by the OFDM modulating system, the pilot signals (pilot subcarrier components) included in the OFDM signals are used as reference signals by the channel estimators 43, 53 to estimate the channel characteristics; the estimated power corresponding to each of the results is calculated by the estimated power value calculators 44, 54; the estimated power values are input to the power ratio comparator 31 as the received power; the power ratio comparator 31 calculates the power ratio of the power values; the calculated power ratio is compared with the predetermined threshold; the result of the comparison is output to the selective/equal gain combining selector 33.

A first demodulator 46 and second demodulator 56 demodulate each subcarrier component by dividing the frequency domain signals output from the FFT units 42, 52 by signals corresponding to the channel estimation results output from the channel estimators 43, 53. This operation is equivalent to multiplying the frequency domain signal by the complex conjugate signal of the channel estimation results and then dividing the result by the power value of the estimated channel characteristic. More specifically, the first demodulator 46 multiplies the output of the first FFT unit 42 by the complex conjugate signal of the output of the first channel estimator 43 and divides the result by the first estimated power value $P_{es\_A}$. The second demodulator 56 multiplies the output of the second FFT unit 52 by the complex conjugate signal of the output of the second channel estimator 53 and divides the result by the second estimated power value $P_{es\_B}$.

Next, the internal structure of the selective/equal gain combining selector 33 will be described. The selective/equal gain combining selector 33 has a signal selector 61 and an equal-gain signal combiner 62. The signal selector 61 outputs a signal by the selection diversity system; more specifically, it selects either the first demodulated signal output from the first OFDM demodulator 15 or the second demodulated signal output from the second OFDM demodulator 25 and outputs the selected signal as the selected demodulated signal.

The equal-gain signal combiner 62 outputs a signal by the equal-gain combined diversity system; it combines the first demodulated signal output from the first OFDM demodulator 15 and the second demodulated signal output from the second OFDM demodulator 25 with equal gain and outputs the result as a combined demodulated signal.

In the selective/equal gain combining selector 33, switching between the signal selector 61 and equal-gain signal combiner 62 may be performed by providing a switching means or other equivalent means. The received signal used in this embodiment is an OFDM signal, which includes a plurality of subcarrier components; a demodulated signal output unit 68 outputs either the selectively demodulated signal or the combined demodulated signal for each subcarrier component. The signal resulting from the comparison by the power ratio comparator 31 is obtained from the result of a comparison of the power ratio with a threshold value that is determined under the condition that the received-power-to-noise-power ratio of the demodulated signal obtained by equal-gain combining of the plurality of demodulated signals must equal the maximum of the received-power-to-noise-ratios of the plurality of demodulated signals.

The selective/equal gain combining selector 33 outputs to the error correction unit 34 either the demodulated signal obtained by the signal selector 61 or the demodulated signal obtained by the equal-gain signal combiner 62 as a selectively combined or equal-gain combined signal, responsive to the output from the power ratio comparator 31.

The method of determining from the output of the power ratio comparator 31 whether to use the demodulated signal from the signal selector 61 or the demodulated signal from the equal-gain signal combiner 62 as the selectively combined or equal-gain combined signal will be described.

In general, when two antennas, the first antenna 11 and second antenna 21, are used to perform spatially selective diversity, or selection diversity, the instantaneous received-power-to-noise-power ratio of the finally output demodulated signal $(CNR)_{SC}$ is expressed by equation 1 below.

$$(CNR)_{SC} = \max[(CNR)_A, (CNR)_B] \qquad (1)$$

$(CNR)_A$, $(CNR)_B$, and $(CNR)_{SC}$ are the carrier-to-noise ratios of the subcarrier on demodulation path A, the subcarrier on demodulation path B, and the selectively combined signal, respectively; the function max[X1, X2] selects and outputs the larger of X1 and X2. It is assumed that the two antennas receive signals with equal noise power. Under this assumption, the amounts of power corresponding to the subcarriers are proportional to the values of $(CNR)_A$ and $(CNR)_B$.

The carrier-to-noise ratio of the final demodulated signal output by the equal gain combining diversity system, $(CNR)_{EGC}$, is expressed by equation 2 below.

$$(CNR)_{EGC} = \frac{1}{2}\left(\sqrt{(CNR)_A} + \sqrt{(CNR)_B}\right)^2 \qquad (2)$$

If the carrier-to-noise ratio of the final demodulated signal output by the maximal ratio combining diversity system is $(CNR)_{MRC}$, $(CNR)_{MRC}$ is expressed by equation 3 below.

$$(CNR)_{MRC} = (CNR)_A + (CNR)_B \qquad (3)$$

Figure 3:
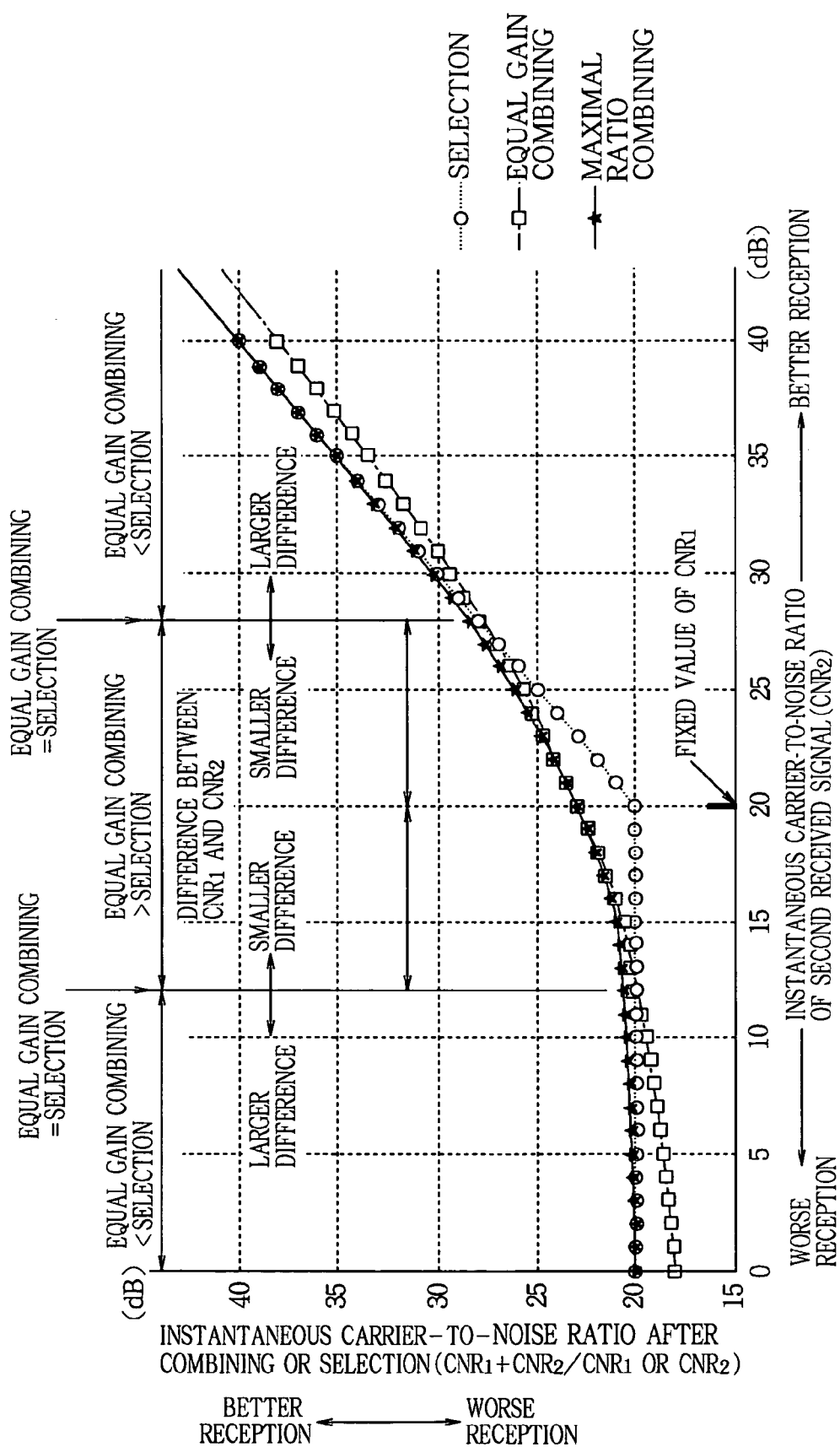
FIG. 3 is a drawing simulating the CNR's in the selection system, equal gain combining system, and maximal ratio combining system.

FIG. 3 is a graph showing computer simulation results of the carrier-to-noise ratios for selection diversity, equal gain combining diversity, and maximal ratio combining diversity, based on equations 1, 2, and 3. $(CNR)_A$ becomes $CNR_1$ in FIG. 3, and $(CNR)_B$ becomes $CNR_2$; the graph shows the carrier-to-noise ratios of the final output demodulated signals for each type of diversity if $CNR_1$ is fixed at 20 dB and $CNR_2$ is varied from 0 dB to 40 dB. The circles indicate the carrier-to-noise ratio for selection diversity; the squares indicate the carrier-to-noise ratio for equal gain combining diversity; the stars indicate the carrier-to-noise ratio for maximal ratio combining diversity.

It can be seen from FIG. 3 that the closer the carrier-to-noise ratio $CNR_2$ of the second received signal is to the carrier-to-noise ratio $CNR_1$ of the first received signal (fixed at 20 dB in FIG. 3), the less the diversity effect of selection diversity becomes in comparison with maximal ratio combining diversity. For equal gain combining diversity, conversely, the further $CNR_2$ is from $CNR_1$, the less the diversity effect becomes in comparison with maximal ratio combining diversity.

It can accordingly be seen that the diversity effect can be improved by choosing either the selected demodulated signal obtained by the signal selector 61 or the combined demodulated signal obtained by the equal-gain signal combiner 62 as the selectively combined or equal gain combined signal. The choice can be made between using the selected demodulated signal or the combined demodulated signal as the selectively combined or equal gain combined signal by setting boundaries where the carrier-to-noise ratio obtained by selection diversity becomes equal to the carrier-to-noise ratio obtained by equal gain combining diversity. That is, the switchover between the selected demodulated signal and the combined demodulated signal can be made according to formula 4 below. The term $3+2\sqrt{2}$ in formula 4 is the value of the ratio of the carrier-to-noise ratios at which the left side of equation 1 becomes equal to the left side of equation 2. Diversity carried out by switching between the selected demodulated signal and combined demodulated signal according to the condition given in formula 4 will also be referred to as adaptive combining diversity in the description below.

$$\text{Combining method} = \begin{cases} \text{equal gain,} & \text{when } \frac{\max[(CNR)_A, (CNR)_B]}{\min[(CNR)_A, (CNR)_B]} \leq 3 + 2\sqrt{2} \\ \text{selection,} & \text{otherwise} \end{cases} \quad (4)$$

When the selected demodulated signal is selected according to formula 4, in the signal selector 61, it suffices to select one of the demodulated signals output from demodulation paths A and B according to the condition given in formula 5 below, $$\text{Combined signal} = \begin{cases} S_A, & \text{when } (CNR)_A \geq (CNR)_B \\ S_B, & \text{otherwise} \end{cases} \quad (5)$$

In formula 5, $S_A$ denotes the demodulated signal input to the selective/equal gain combining selector 33 through demodulation path A, that is, the first demodulated signal, and $S_B$ denotes the demodulated signal input to the selective/equal gain combining selector 33 through demodulation path B, that is, the second demodulated signal.

Adaptive diversity is a system that selects either selection diversity or equal gain combining diversity adaptively to increase the carrier-to-noise ratio corresponding to the final output demodulated signal.

Figure 4:
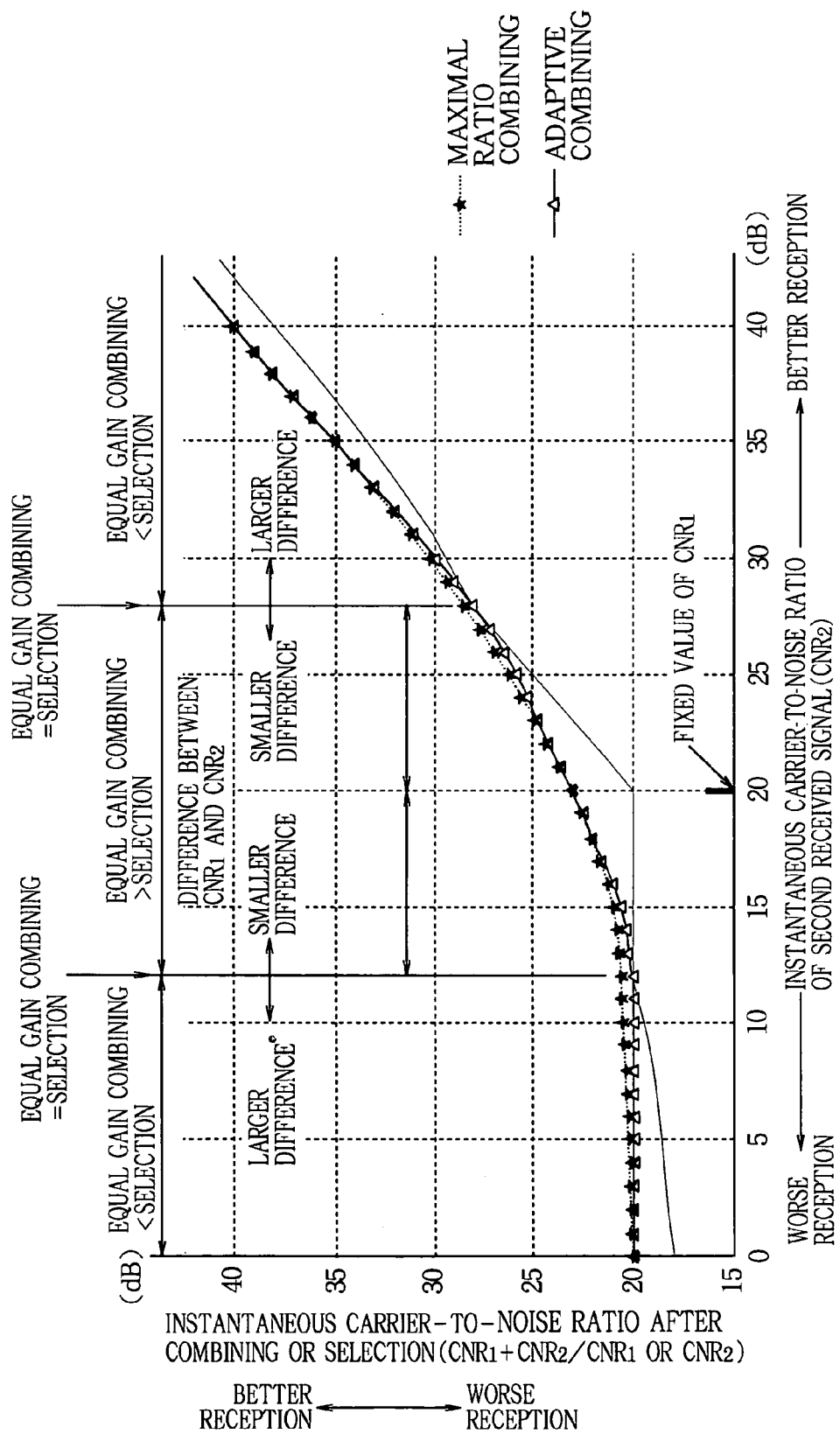
FIG. 4 is a drawing simulating the CNRs in the adaptive combining system and maximal ratio combining system.

FIG. 4 shows computer simulated results of carrier-to-noise ratios when adaptive combining diversity and maximal ratio combining diversity are used. $CNR_1$ is fixed at 20 dB, and $CNR_2$ is varied from 0 dB to 40 dB. The triangles in FIG. 4 indicate the carrier-to-noise ratio obtained by adaptive combining diversity; the stars indicate the carrier-to-noise ratio obtained by maximal ratio combining diversity.

In FIG. 4, the adaptive diversity processing was switched at the points at which the carrier-to-noise ratio obtained by selection diversity and the carrier-to-noise ratio obtained by equal gain combining diversity became equal (near 12 dB and 28 dB on the scale on the horizontal axis in FIG. 4). The output was accordingly obtained by selection diversity when $CNR_2$ was greater than 0 dB and less than about 12 dB, and when $CNR_2$ was greater than about 28 dB, and by equal gain combining diversity in the interval from about 12 dB to about 28 dB. That is, selection diversity and equal gain combining diversity were switched at threshold values of ±8 dB from a center value of 20 dB on the horizontal scale in FIG. 4.

The value of $CNR_2$ at 12 dB on the horizontal scale under the conditions in FIG. 4, $$CNR_2 = 10 \times \log_{10}(10^{(20/10)}/(3+2\sqrt{2})) \text{ dB}$$

corresponds to the case in which the value of the CNR ratio in formula 4 is:

$$(CNR)_A/(CNR)_B = 3+2\sqrt{2}$$

The value of $CNR_2$ at 28 dB on the horizontal scale under the conditions in FIG. 4, $$CNR_2 = 10 \times \log_{10}(10^{(20/10)}/(3+2\sqrt{2})) \text{ dB}$$

corresponds to the case in which the value of the CNR ratio in formula 4 is:

$$(CNR)_B/(CNR)_A = 3+2\sqrt{2}$$

From the above, the threshold value in the power ratio comparator 31 is determined from conditions under which the received-power-to-noise-power ratio of the demodulated signal obtained by combining a plurality of demodulated signals with equal gain becomes equal to the maximal received-power-to-noise-power ratio among the received-power-to-noise-power ratios corresponding to each of the plurality of demodulated signals. The signal selector 61 selects and outputs the demodulated signal having the maximal received-power-to-noise-power ratio among the received-power-to-noise-power ratios corresponding to each of the demodulated signals output from demodulation paths A and B.

It can be seen from FIG. 4 that by using the adaptive combining diversity described above in the first embodiment, the diversity effect can be improved, compared with the use of selection diversity or equal gain combining diversity alone, the effect becoming substantially the same as when maximal ratio combining diversity is used.

Adaptive combining diversity can accordingly be carried out by input of the power ratio threshold value corresponding to the estimated power ratio $P_{es\_R}$, using the correspondence relationship between the estimated power values $P_{es\_A}$, $P_{es\_B}$ and $(CNR)_A$, $(CNR)_B$.

Thus, because the diversity receiver in the first embodiment is structured to output either a selected demodulated signal or a combined demodulated signal as the selectively combined or equal gain combined signal for each subcarrier component adaptively, in such a way as to increase the carrier-to-noise ratio of the selectively combined or equal gain combined signal output from the selective/equal gain combining selector 33, it becomes possible to increase the diversity effect as compared with conventional diversity receivers using only selection diversity or only equal gain combining diversity. The receiving performance of the diversity receiver can also be improved. The diversity receiver in the first embodiment can also increase the diversity effect with a smaller circuit scale than when maximal ratio combining diversity is practiced.

SECOND EMBODIMENT

The first embodiment provides a structure in which adaptive combining diversity is carried out using power estimates $P_{es\_A}$, $P_{es\_B}$ output from the estimated power value calculators 44, 54. In the second embodiment, the power of the subcarrier components is calculated from the signal output after the Fourier transform, and adaptive combining diversity is carried out using the calculated result. In the description below, subcarrier component power is also referred to as subcarrier power, and the value of the subcarrier power is also referred to as a subcarrier power value.

Figure 5:
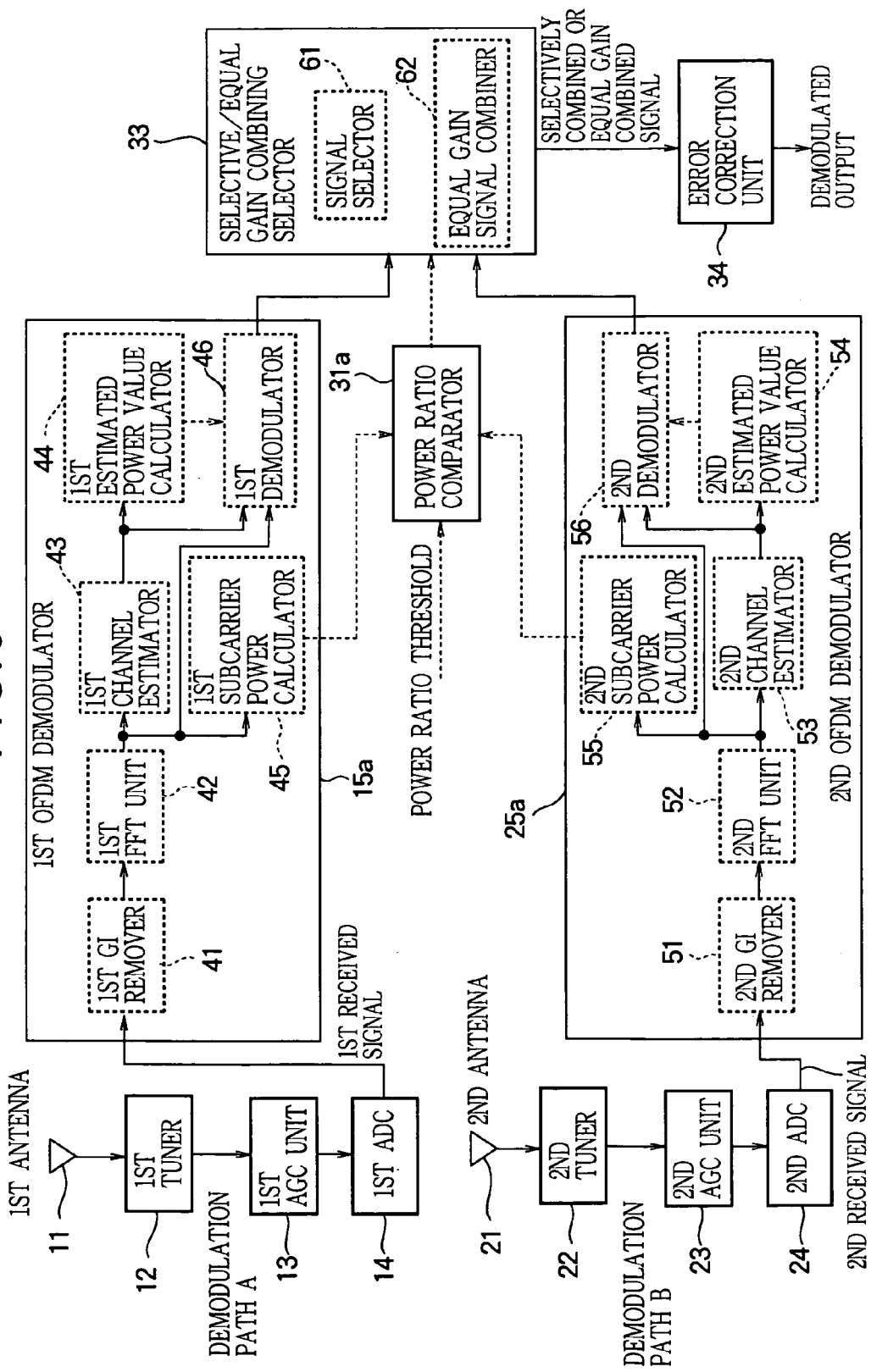
FIG. 5 is a block diagram illustrating a diversity receiver in a second embodiment of the invention.

FIG. 5 is a block diagram showing a diversity receiver in the second embodiment.

The structure of the diversity receiver in FIG. 5 is the same as shown in FIG. 1 in the first embodiment, except for the first OFDM demodulator 15a, second OFDM demodulator 25a, power ratio comparator 31a, first subcarrier power calculator 45, and second subcarrier power calculator 55, and except that there are no output connections from the first estimated power value calculator 44 and second estimated power value calculator 54 to the power ratio comparator 31a.

The operation of the diversity receiver in the second embodiment will be described below. Descriptions of structures that are the same as in the first embodiment will be omitted.

The first subcarrier power calculator 45 in the first OFDM demodulator 15a receives the frequency domain signal on demodulation path A, and calculates and then outputs the subcarrier power $P_{c\_A}$ of the frequency domain signal. Similarly, the second subcarrier power calculator 55 in the second OFDM demodulator 25a receives the frequency domain signal on demodulation path B, and calculates and then outputs the subcarrier power $P_{c\_B}$ of the frequency domain signal.

The power ratio comparator 31a receives subcarrier power values $P_{c\_A}$, $P_{c\_B}$ and a predetermined threshold value corresponding thereto. In the second embodiment, this threshold value, to which a power ratio obtained from the above power values is compared, will be referred to as the power ratio threshold value, as in the first embodiment.

The power ratio comparator 31a determines which of the two subcarrier power values, $P_{c\_A}$, $P_{c\_B}$ is larger. It furthermore compares the subcarrier power ratio $P_{c\_R}$ obtained by dividing the larger one of the two subcarrier power values $P_{c\_A}$ and $P_{c\_B}$ by the smaller one with the power ratio threshold value, and outputs a signal corresponding to the result of the comparison for each subcarrier to the selective/equal gain combining selector 33.

More specifically, when the subcarrier power ratio $P_{c\_R}$ is smaller than the power ratio threshold value, the power ratio comparator 31a outputs to the selective/equal gain combining selector 33 a signal indicating that the demodulated signal obtained in the equal-gain signal combiner 62 is to be output. Conversely, when the subcarrier power ratio $P_{c\_R}$ is larger than the power ratio threshold value, the power ratio comparator 31a outputs to the selective/equal gain combining selector 33 a signal indicating that the demodulated signal corresponding to the larger of the two subcarrier power values $P_{c\_A}$ and $P_{c\_B}$ is to be selected.

Responsive to the signal received from the power ratio comparator 31a, the selective/equal gain combining selector 33 selects either selection diversity, in which either the demodulated signal from the first OFDM demodulator 15a or the demodulated signal from the second OFDM demodulator 25a is selected and output, or equal gain combining diversity, in which a demodulated signal obtained by combining the two demodulated signals from the first OFDM demodulator 15a and second OFDM demodulator 25a with equal gain is selected and output.

That is, according to the output of the power ratio comparator 31a, the selective/equal gain combining selector 33 outputs the output signal from the first demodulator 46 alone, the output signal from the second demodulator 56 alone, or a combined output signal obtained by combining the above output signals.

Accordingly, the selectively combined or equal gain combined signal output from the selective/equal gain combining selector 33 is a signal obtained for each subcarrier component by adaptively selecting either a demodulated signal corresponding to one of the subcarrier power values $P_{c\_A}$ and $P_{c\_B}$ of the pair of received signals or the demodulated signal obtained by combining the first demodulated signal and the second demodulated signal with equal gain responsive to the subcarrier power ratio $P_{c\_R}$, having a reduced error rate resulting from the diversity effect of the two demodulating paths A and B.

As described above, like the first embodiment, the second embodiment is structured so that subcarrier component power values $P_{c\_A}$ and $P_{c\_B}$ corresponding to $(CNR)_A$ and $(CNR)_B$ are calculated after the Fourier transform, and adaptive combining diversity is carried out using the result. This structure makes it possible to carry out adaptive combining diversity without being affected by channel estimation errors, thus improving the receiving performance of the diversity receiver.

THIRD EMBODIMENT

The diversity receivers in the first and second embodiments are structured so that estimated power or subcarrier power is determined from frequency domain signals output from the FFT units 42 and 52, based on which adaptive combining diversity is carried out. In the third embodiment, the power levels of the signals input through the antennas 11, 21 are determined and adaptive combining diversity is carried out by using these power levels, as described below.

Figure 6:
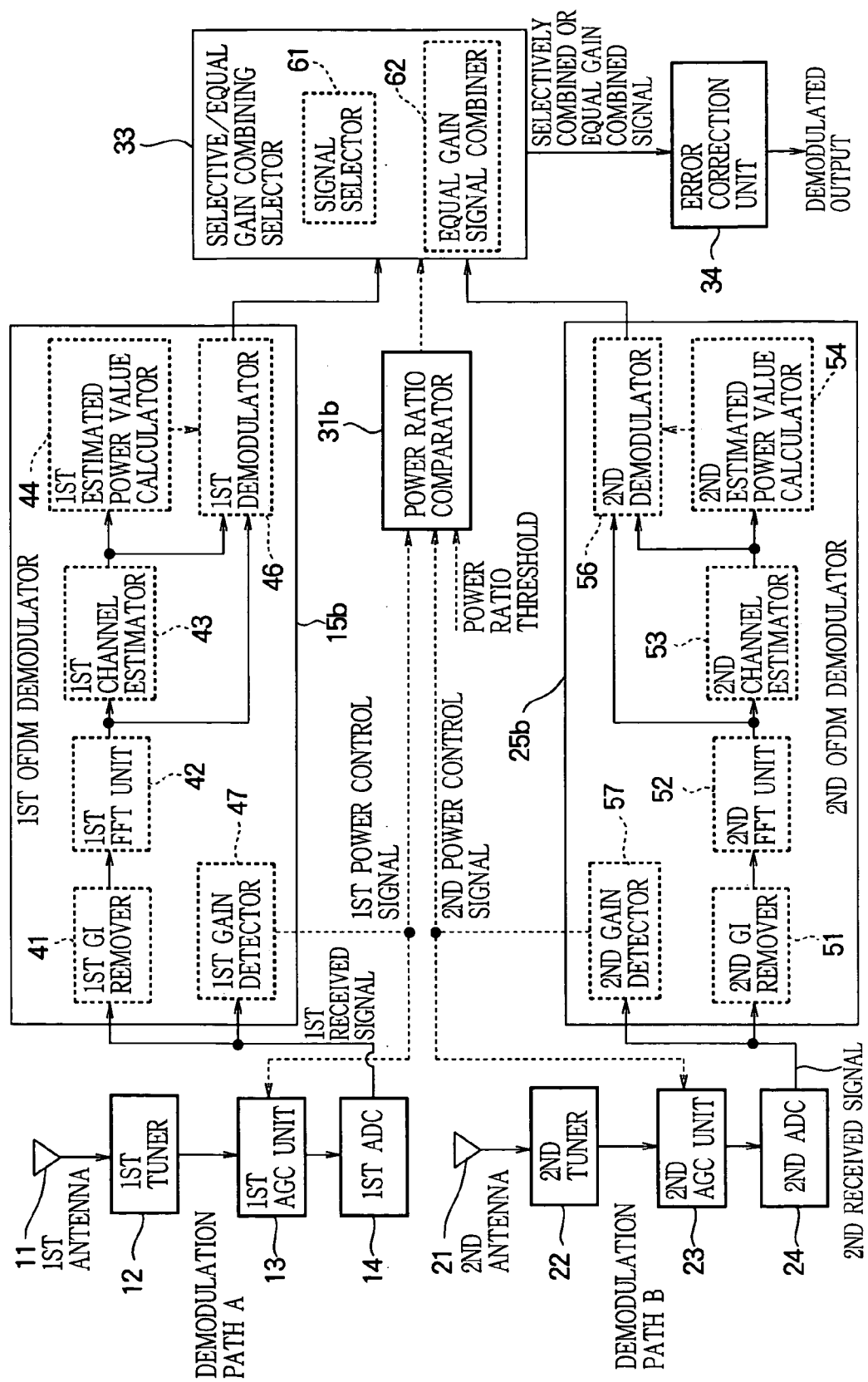
FIG. 6 is a block diagram illustrating a diversity receiver in a third embodiment of the invention.

FIG. 6 is a block diagram showing the diversity receiver in the third embodiment.

The structure of the diversity receiver in FIG. 6 is the same as shown in FIG. 1 in the first embodiment or in FIG. 6 in the second embodiment, except for the first OFDM demodulator 15b, second OFDM demodulator 25b, power ratio comparator 31b, input connections to the AGC units 13, 23, and output connections from the ADC's 14, 24.

The operation of the diversity receiver in the third embodiment will be described below. Descriptions of structures that are the same as in the first or second embodiment will be omitted.

The first gain detector 47 in the first OFDM demodulator 15b receives a first received signal from the first ADC 14, calculates a difference between the average power of the first received signal and a desired power value, and outputs the calculated result as a first power control signal to the power ratio comparator 31b and the first AGC unit 13. Similarly, the second gain detector 57 in the second OFDM demodulator 25b receives a second received signal from the second ADC 24, calculates the difference between the average power of the second received signal and a desired power value, and outputs the calculated result as a second power control signal to the power ratio comparator 31b and the second AGC unit 23.

The first power control signal and the second power control signal are used in the first AGC unit 13 and second AGC unit 23 to select the degree of amplification of the signals received through the antennas 11 and 21; a higher signal level of the power control signal indicates a lower antenna output signal power.

In the gain detectors 47 and 57, increasing the period of time over which the power of the received signal is averaged can improve the reliability of the final average value by allowing errors due to random noise to cancel out. If the averaging period is too long, however, time variations in the power of the received signal can cause performance degradation in some applications. The period of time over which the received signal power is averaged should therefore be optimized for each application.

The first received signal and the second received signal are input to the OFDM demodulators 15b, 25b after gain adjustment. Accordingly, if there is a difference between the antenna gains on demodulation paths A and B, for example, a difference in the power levels of the signals received through antennas 11, 12 causes a difference in the noise power of the first received signal and the second received signal.

The difference in noise power affects the carrier-to-noise ratio of the signal output from the selective/equal gain combining selector 33. In particular, when one of the received signals on the demodulation paths A and B is weaker than the other, and accordingly the amplification factor of the AGC unit 13 or 23 must be increased, the diversity effect is reduced. In order to prevent the diversity effect from being reduced, therefore, it is effective to control adaptive combining diversity according to the power ratio calculated by using the received signals before their gains are adjusted in the AGC units 13, 23.

The power ratio comparator 31b receives the first control signal output from the first gain detector 47, the second control signal output from the second gain detector 57, and a predetermined threshold value. In the third embodiment, the predetermined threshold value, which is compared with the power ratio obtained from the above-mentioned power values, will be referred to as the power ratio threshold value, as in the first embodiment and the second embodiment.

By using the first power control signal and the second power control signal output from the gain detectors 47, 57, the power ratio comparator 31b determines whether the first received signal or the second received signal has the higher power level. Then the power ratio comparator 31b uses the above two power control signals to calculate received signal powers $P_A$, $P_B$ corresponding to the power control signals, compares the received signal power ratio $P_R$, which is obtained by dividing the larger one of the two received signal powers $P_A$, $P_B$ by the smaller one, with the power ratio threshold value, and outputs to the selective/equal gain combining selector 33, for each subcarrier, a signal varying responsive to the comparison result.

More specifically, when the received signal power ratio $P_R$ is smaller than the power ratio threshold value, the power ratio comparator 31b sends the selective/equal gain combining selector 33 a signal indicating that the demodulated signal obtained in the equal-gain signal combiner 62 is to be output. Conversely, when the received signal power ratio $P_R$ is larger than the power ratio threshold value, the power ratio comparator 31b sends the selective/equal gain combining selector 33 a signal indicating that the demodulated signal corresponding to the larger of the two received signal power values $P_{c\_A}$, $P_{c\_B}$ is to be selected.

Based on the signal received from the power ratio comparator 31b, the selective/equal gain combining selector 33 selects either selection diversity, in which either the demodulated signal from the first OFDM demodulator 15b or the demodulated signal from the second OFDM demodulator 25b is selected and output, or equal gain combining diversity, in which a demodulated signal obtained by combining the two demodulated signals from the first OFDM demodulator 15b and second OFDM demodulator 25b with equal gain is selected and output.

That is, according to the output of the power ratio comparator 31b, the selective/equal gain combining selector 33 outputs the output signal from the first demodulator 46 alone, the output signal from the second demodulator 56 alone, or a combined output signal obtained by combining the above output signals.

Accordingly, the selectively combined or equal gain combined signal output from the selective/equal gain combining selector 33 is a demodulated signal obtained for each subcarrier component by adaptively selecting either a demodulated signal obtained by equal gain combining diversity responsive to the received signal power ratio $P_R$ or a demodulated signal obtained by selecting one of the two demodulated signals corresponding to the received signals, having a reduced error rate resulting from the diversity effect of the two demodulating paths A and B.

As described above, since the diversity receiver in the third embodiment is structured so that adaptive combining diversity is carried out by using the control signals for adjusting the power levels of signals received through the antennas 11, 21, even if there is a difference between the receiving power levels of the two received signals, it is possible to combine the signals without reducing the diversity effect. The performance of the diversity receiver can also be improved. Furthermore, even if the receiving power levels of the two received signals differ from each other, it is also possible to combine the signals without reducing the diversity effect, resulting in improved receiving performance of the receiver.

In the third embodiment, the received signal power of each signal is calculated by using the two power control signals as described above and a signal is output from the power ratio comparator 31b on the basis of the received signal power, but the signal output from the power ratio comparator 31b may be based directly on the power control signals. In this case, since as the antenna output signal power decreases, the power control signal power increases, as mentioned above, it is necessary to regard a higher level of the power control signal as indicating a reduced carrier-to-noise ratio. To determine the power control signal ratio, therefore, the reciprocal ratio of the power control signal values is determined, and adaptive combining diversity is carried out according to the reciprocal ratio. When the output of the signal selector 61 is used as the selectively combined or equal gain combined signal, it is necessary to choose between the output signals from the demodulators 46, 56 in the OFDM demodulators 15b, 25b by selecting the output signal corresponding to the smaller of the two power control signals.

FOURTH EMBODIMENT

The diversity receiver in the third embodiment is structured so as to determine the power levels of the signals received through the antennas 11, 21 and carry out adaptive combining diversity per OFDM symbol by using these power levels. The diversity receiver in the fourth embodiment carries out adaptive combining diversity by using the power levels of the signals received through the antennas 11, 21 and the signal power derived from channel estimation for each subcarrier, as described below.

Figure 7:
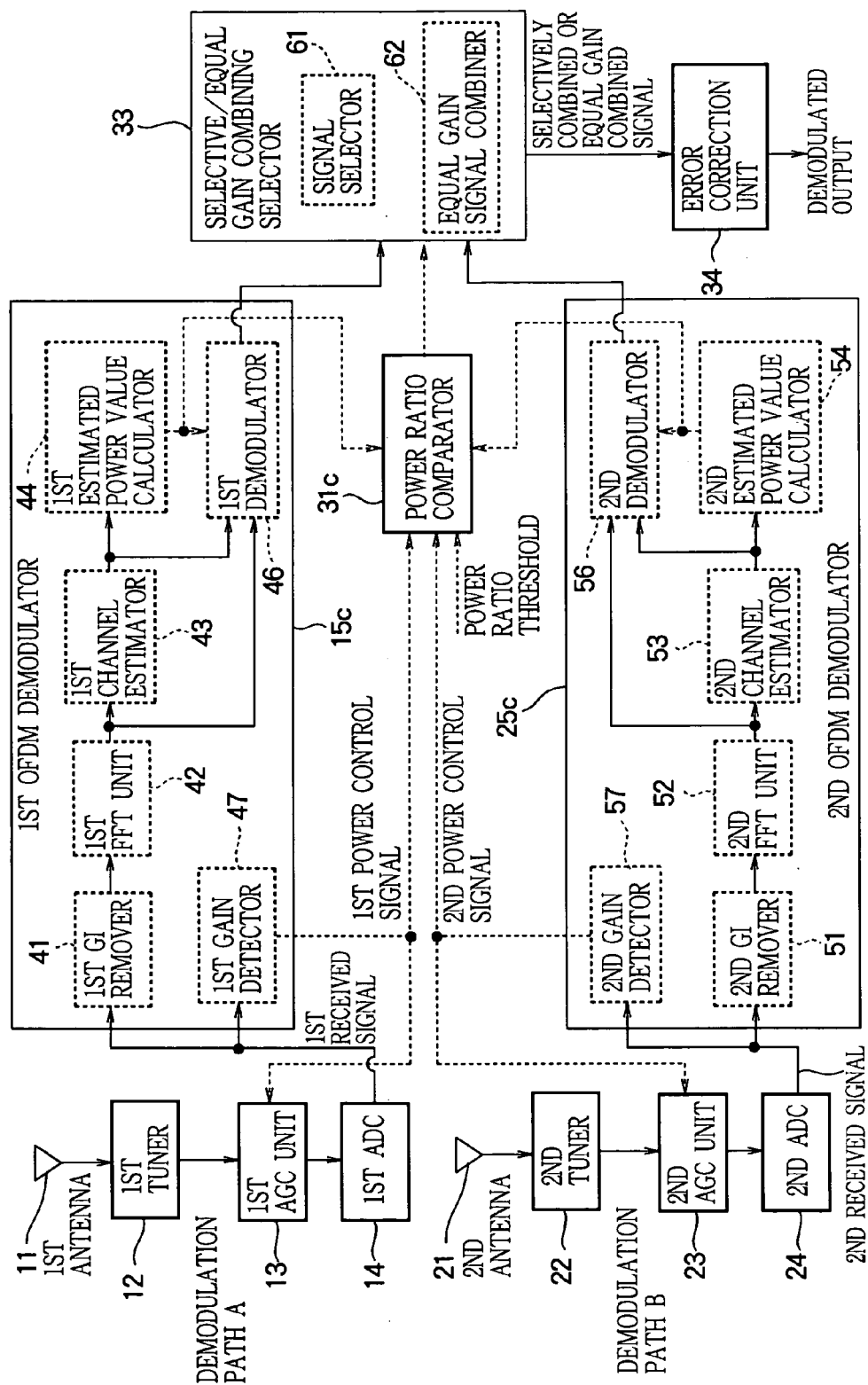
FIG. 7 is a block diagram illustrating a diversity receiver in a fourth embodiment of the invention.

FIG. 7 is a block diagram showing the diversity receiver in the fourth embodiment.

The structure of the diversity receiver in FIG. 7 is the same as shown in FIG. 6 in the third embodiment, except for the first OFDM demodulator 15c, second OFDM demodulator 25c, and power ratio comparator 31c, and except for the output connections to the power ratio comparator 31c from the estimated power value calculators 44, 54, which are the same as shown in FIG. 1 in the first embodiment.

Next, the operation of the diversity receiver will be described. Descriptions of structures that are the same as in the first and third embodiments will be omitted.

The power ratio comparator 31c receives the first control signal output from the first gain detector 47, the second control signal output from the second gain detector 57, the first estimated power output from the first estimated power value calculator 44, the second estimated power output from the second estimated power value calculator 54, and a predetermined threshold value. In the fourth embodiment, as in the first and third embodiments, the predetermined threshold value will be referred to as the power ratio threshold value.

From the first power control signal, the power ratio comparator 31c calculates a coefficient by which to multiply the first estimated power value. Similarly, from the second power control signal it calculates a coefficient by which to multiply the second estimated power value. The power ratio comparator 31c also determines which of the estimated power values, thus multiplied, is larger. The power ratio comparator 31c further compares the power ratio threshold value with a value obtained by dividing the larger one of the two multiplication results, obtained by multiplying the estimated power values by the corresponding coefficients, by the smaller one, and outputs a signal varying for each subcarrier responsive to the comparison result to the selective/equal gain combining selector 33.

Responsive to the signal received from the power ratio comparator 31a, the selective/equal gain combining selector 33 selects either selection diversity, in which either the demodulated signal from the first OFDM demodulator 15c or the demodulated signal from the second OFDM demodulator 25c is selected and output, or equal gain combining diversity, in which a demodulated signal obtained by combining the two demodulated signals from the first OFDM demodulator 15c and second OFDM demodulator 25c with equal gain is selected and output.

The coefficients by which the outputs of the first estimated power value calculator 44 and second estimated power value calculator 54 are multiplied will now be described. As noted above, too large a noise power differential between the first received signal and the second received signal reduces the diversity effect. In order to prevent the diversity effect from being reduced, therefore, it is effective to control adaptive combining diversity by considering the power ratio of the received signals before their gains are adjusted.

The relationship among the power values of the signals received through the first antenna 11 and the second antenna 21, the gain adjustment quantities of the signals received through the first antenna 11 and the second antenna 21, and the values of the output signals of the first estimated power value calculator 44 and second estimated power value calculator 54 corresponding to a subcarrier component can be approximately represented by equation 6 below.

$$\frac{P_A}{P_B} = \frac{G_B x_A}{G_A x_B} \qquad (6)$$

In this equation, $P_A$ is the power of the signal received through the first antenna 11, $P_B$ is the power of the signal received through the second antenna 21, $G_A$ is the gain adjustment quantity of the signal received through the first antenna 11, $G_B$ is the gain adjustment quantity of the signal received through the second antenna 21, $x_A$ is the output of the first estimated power value calculator 44 corresponding to the subcarrier component, and $x_B$ is the output of the second estimated power value calculator 54 corresponding to the subcarrier component.

From the above equation, it can be seen that gain adjustment of the output of the first estimated power value calculator 44 in the first AGC unit 13 may be carried out by multiplying the output of the first estimated power value calculator 44 by a coefficient proportional to $G_B$. Similarly, gain adjustment of the output from the second estimated power value calculator 54 in the second AGC unit 23 may be carried out by multiplying the output of the second estimated power value calculator 54 by a coefficient proportional to $G_A$.

The power ratio comparator 31c carries out the decision process described by equations 4 and 5, for example, responsive to each pair of estimated power values obtained by multiplication by the above-mentioned coefficients.

Responsive to the output from the power ratio comparator 31c, the selective/equal gain combining selector 33 outputs the first modulated signal, the second modulated signal, or a modulated signal obtained by combining the first modulated signal and the second modulated signal with equal gain.

Accordingly, the output of the selective/equal gain combining selector 33 is a signal obtained by carrying out adaptive combining diversity responsive to the power ratio of the signals received through the two antennas 11, 21 and the power ratio corresponding to the result of channel characteristic estimation of the received signals after the gain adjustment.

As described above, since the fourth embodiment provides a structure in which adaptive combining diversity is carried out using the power control signals for adjusting the power levels of the signals received from antennas 11, 21 and the power values corresponding to the results of channel characteristic estimation for each subcarrier component, even if there is a difference between the power levels of the two received signals, it is possible to combine the signals without reducing the diversity effect, resulting in improved receiving performance of the receiver.

FIFTH EMBODIMENT

The diversity receiver in the fourth embodiment is structured so that adaptive combining diversity is carried out by using the power levels of the signals received through the antennas 11, 21 and the power values corresponding to the results of the channel characteristic estimation for each subcarrier. The diversity receiver in the fifth embodiment carries out adaptive combining diversity by using the power levels of the signals received through the antennas 11, 21 and the signal power for each subcarrier, as described below.

Figure 8:
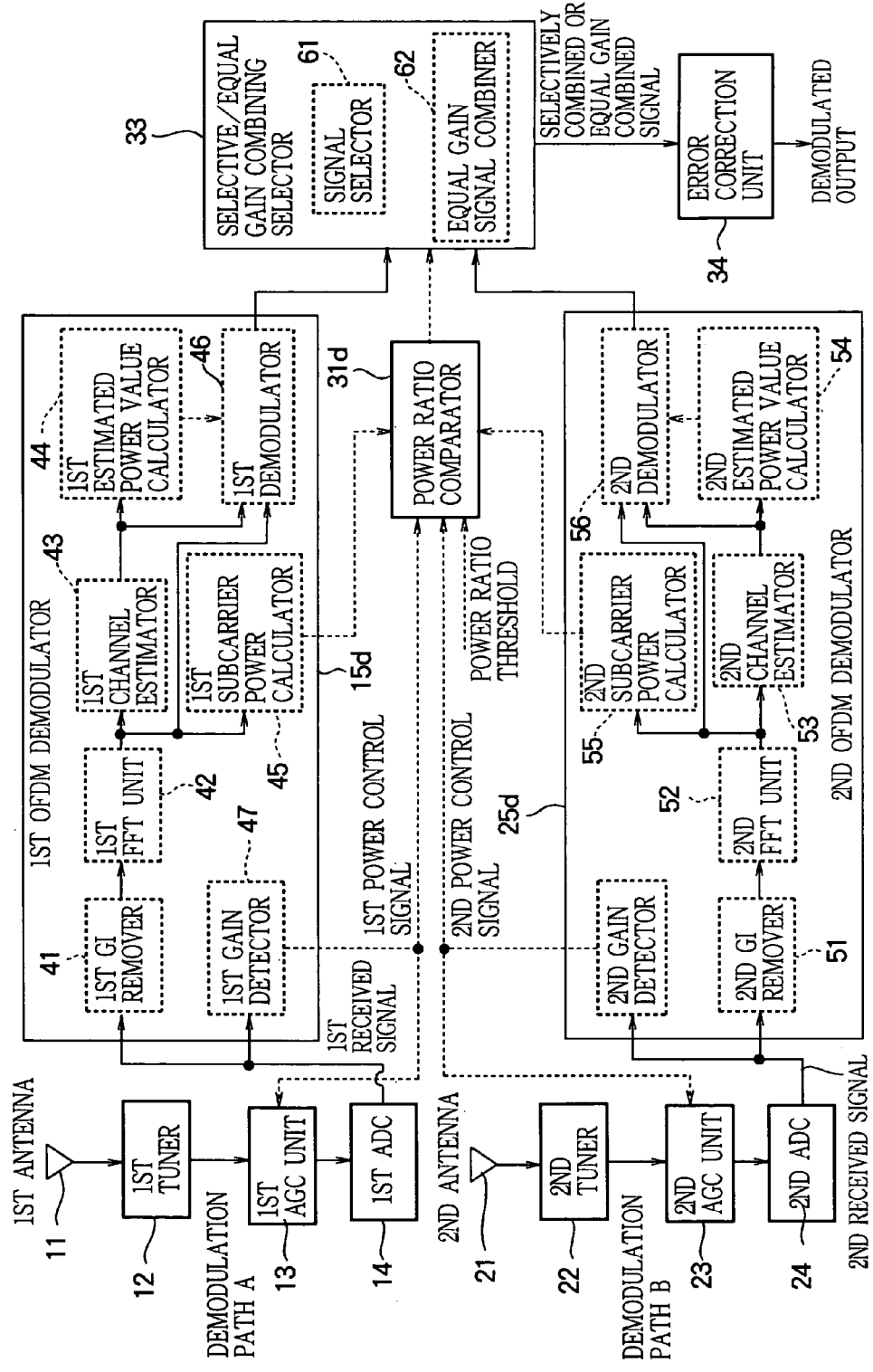
FIG. 8 is a block diagram illustrating a diversity receiver in a fifth embodiment of the invention.

FIG. 8 is a block diagram showing the diversity receiver in the fifth embodiment.

The structure of the diversity receiver in FIG. 8 is the same as shown in FIG. 7 in the fourth embodiment, except for the first OFDM demodulator 15d, second OFDM demodulator 25d, power ratio comparator 31d, first subcarrier power calculator 45, and second subcarrier power calculator 55, and except that there are no output connections to the power ratio comparator 31d from the first estimated power value calculator 44 and second estimated power value calculator 54. The first subcarrier power calculator 45 and second subcarrier power calculator 55 are the same as shown in FIG. 5 in the second embodiment.

Next, the operation of the diversity receiver in the fifth embodiment will be described. Descriptions of structures that are the same as in the first and fourth embodiments will be omitted.

The power ratio comparator 31d receives the first control signal output from the first gain detector 47, the second control signal output from the second gain detector 57, the first subcarrier power output from the first subcarrier power calculator 45, the second subcarrier power output from the second subcarrier power calculator 55, and a predetermined threshold value. In the fifth embodiment, as in the first and fourth embodiments, the predetermined threshold value, which is compared with a power ratio obtained from the above-mentioned power values, will be referred to as the power ratio threshold value.

The power ratio comparator 31d multiplies the first subcarrier power by a coefficient determined from the first power control signal. Similarly, it multiplies the second subcarrier power by a coefficient determined from the second power control signal. The power ratio comparator 31*d* further determines which of the multiplication results for the first subcarrier power and second subcarrier power is larger; then it compares the power ratio threshold value with a value obtained by dividing the larger one of the two multiplication results by the smaller one, and outputs a signal varying for each subcarrier responsive to the comparison result to the selective/equal gain combining selector 33. The above coefficient may be determined in the same way as in the fourth embodiment. More specifically, it can be determined by processing of the outputs of the first estimated power value calculator 44 and second estimated power value calculator 54 similar to the processing of the outputs of the first subcarrier power calculator 45 and second subcarrier power calculator 55.

Responsive to the signal received from the power ratio comparator 31*d*, the selective/equal gain combining selector 33 selects either selection diversity, in which either the demodulated signal from the first OFDM demodulator 15*d* or the demodulated signal from the second OFDM demodulator 25*d* is selected and output, or equal gain combining diversity, in which a demodulated signal obtained by combining the two demodulated signals from the first OFDM demodulator 15*d* and second OFDM demodulator 25*d* with equal gain is selected and output.

The power ratio comparator 31*d* carries out the decision process described by equations 4 and 5, for example, responsive to the results obtained by multiplying the subcarrier powers output from the first subcarrier power calculator 45 and second subcarrier power calculator 55 by the coefficients.

Responsive to the output from the power ratio comparator 31*d*, the selective/equal gain combining selector 33 outputs the first modulated signal, the second modulated signal, or a modulated signal obtained by combining the first modulated signal and the second modulated signal with equal gain.

Accordingly, the output of the selective/equal gain combining selector 33 is a signal obtained by adaptively switching between equal gain combining diversity and selection diversity for each subcarrier responsive to the power ratio of the pair of signals received through the antennas 11, 21 and the subcarrier power ratio of the received signals after the gain adjustment.

As described above, since the fifth embodiment provides a structure in which adaptive combining diversity is carried out using the power control signals for adjusting the power levels of the signals received from the antennas 11, 21 and the power values of the subcarrier components after the Fourier transform, even if there is a difference between the power levels of the two received signals, it is possible to combine the signals without reducing the diversity effect, resulting in improved receiving performance of the receiver, and it is possible to carry out adaptive combining diversity without being affected by channel characteristic estimation error, also resulting in improved receiving performance of the receiver.

SIXTH EMBODIMENT

The diversity receiver in the fifth embodiment is structured so that adaptive combining diversity is carried out by using the power levels of the signals received through the antennas 11, 21 and the signal power of each subcarrier. The diversity receiver in the sixth embodiment carries out adaptive combining diversity by adaptively changing the threshold value for the power ratio comparator responsive to the power levels of the signals received through the antennas 11, 21 and using the threshold value and the estimated power values, as described below.

Figure 9:
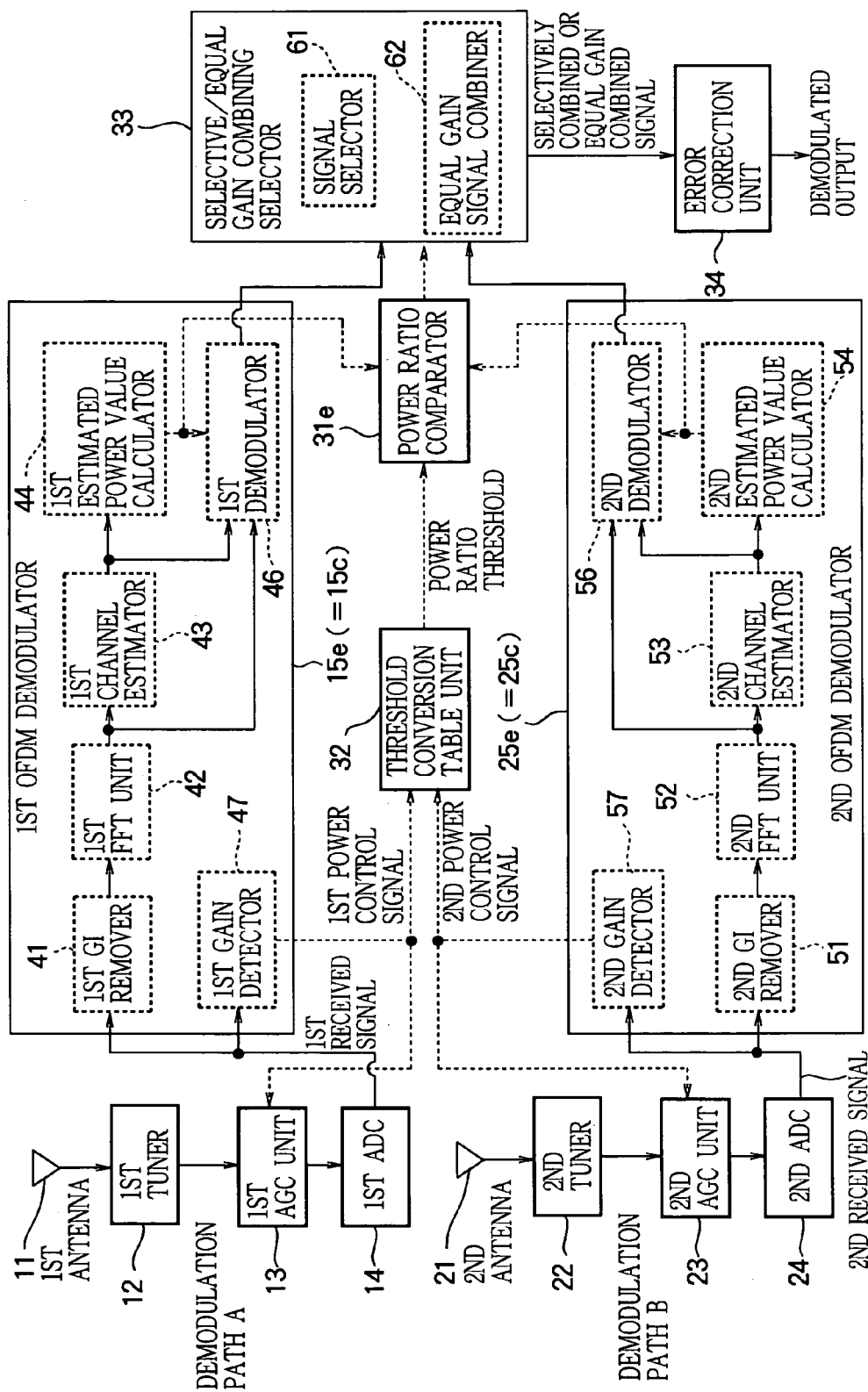
FIG. 9 is a block diagram illustrating a diversity receiver in a sixth embodiment of the invention.

FIG. 9 is a block diagram showing the diversity receiver in the sixth embodiment.

The structure of the diversity receiver in FIG. 9 is the same as shown in FIG. 8 in the fifth embodiment, except for the power ratio comparator 31*e*, a threshold conversion table unit 32 provided between the first gain detector 47 and second gain detector 57 and the power ratio comparator 31*e*, and except that the power ratio threshold value is output from the threshold conversion table unit 32 to the power ratio comparator 31*e*. The first OFDM demodulator 15*e* and second OFDM demodulator 25*e* in FIG. 9 have the same structure as the first OFDM demodulator 15*c* and second OFDM demodulator 25*c* in FIG. 7 in the fourth embodiment.

Next, the operation of the diversity receiver in the sixth embodiment will be described. Descriptions of structures that are the same as in the first and fifth embodiments will be omitted.

The threshold conversion table unit 32 outputs a power ratio threshold value that varies responsive to the first power control signal output from the first gain detector 47 and the second power control signal output from the second gain detector 57. That is, while the power ratio threshold value is predetermined in the first to fifth embodiments, the threshold conversion table unit 32 outputs a power ratio threshold value varying responsive to the first power control signal and the second power control signal.

The power ratio threshold value in this embodiment is determined from equation 6 by multiplying a predetermined power ratio threshold value by the ratio of the first power control signal and the second power control signal. Accordingly, the threshold conversion table unit 32 may prestore the results of multiplication of the predetermined power ratio threshold value by the ratio of the first control signal and the second control signal.

The power ratio comparator 31*e* receives the first estimated power value, the second estimated power value, and the predetermined power ratio threshold value, and determines which of the first estimated power value and the second estimated value is larger; then it compares the power ratio threshold value received from the threshold conversion table unit 32 with a value obtained by dividing the larger one of the two estimated power values by the smaller one, and outputs a signal varying for each subcarrier responsive to the comparison result to the selective/equal gain combining selector 33.

Responsive to the signal received from the power ratio comparator 31*e*, the selective/equal gain combining selector 33 selects either selection diversity, in which either the demodulated signal from the first OFDM demodulator 15*e* or the demodulated signal from the second OFDM demodulator 25*e* is selected and output, or equal gain combining diversity, in which a demodulated signal obtained by combining the two demodulated signals from the first OFDM demodulator 15*e* and second OFDM demodulator 25*e* with equal gain is selected and output.

That is, the selective/equal gain combining selector 33 outputs, responsive to the output from the power ratio comparator 31*e*, the first modulated signal, the second modulated signal, or a modulated signal obtained by combining the first modulated signal and the second modulated signal with equal gain.

Accordingly, the output of the selective/equal gain combining selector 33 is a signal obtained by adaptively selecting either one of a pair of demodulated signals on the demodulation paths A, B, which is selected responsive to the power ratio of the two channel characteristic estimation values of the two received signals for each subcarrier component, or a demodulated signal obtained by combining the demodulated signals on demodulation paths A, B; the diversity effect of the two demodulation paths A and B reduces the error rate of the modulated signal.

As described above, the sixth embodiment provides a structure in which adaptive combining diversity is carried out by adaptively varying the power ratio threshold value responsive to the power levels of the signals received through the antennas 11, 21, and using the varying power ratio threshold value and power values corresponding to the channel characteristic estimation results; thus it can eliminate the need for a multiplier for correcting the power values resulting from channel estimation according to the power control signals, with the effect that the diversity combining process for each subcarrier can be carried out by a receiver with less circuitry, without a reduction of the diversity effect due to a difference between the receiving power levels.

SEVENTH EMBODIMENT

The diversity receiver in the sixth embodiment carries out adaptive combining diversity by adaptively changing the threshold value responsive to the power levels of the signals received through the antennas 11, 21 and using the threshold value and the estimated power values as described above. The diversity receiver in the seventh embodiment is another example of the diversity receiver in the sixth embodiment FIG. 10 is a block diagram showing the diversity receiver in the seventh embodiment.

Figure 10:
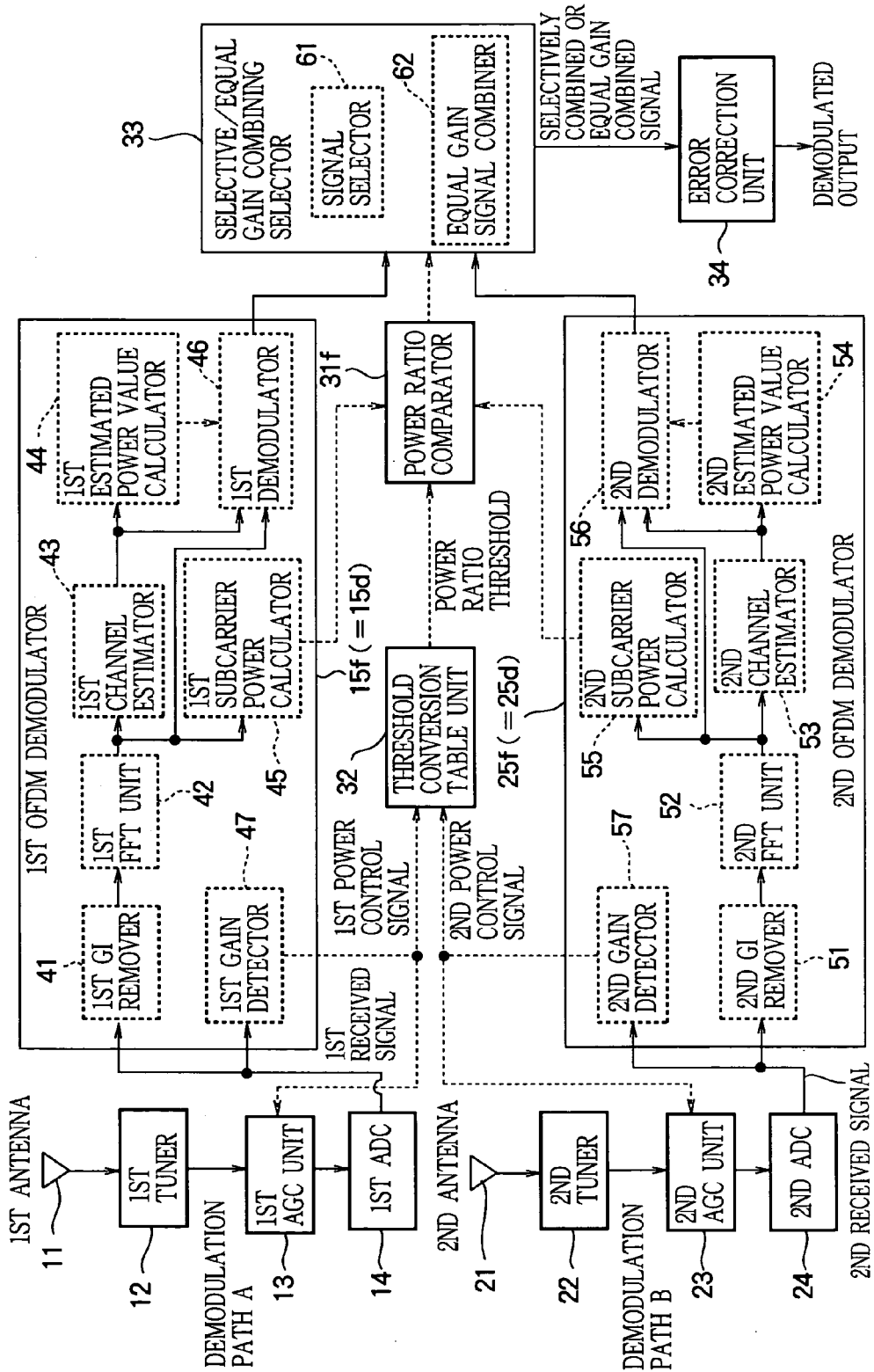
FIG. 10 is a block diagram illustrating a diversity receiver in a seventh embodiment of the invention.

The structure of the diversity receiver in FIG. 10 is the same as shown in FIG. 9 in the sixth embodiment, except for the power ratio comparator 31*f*, first subcarrier power calculator 45, and second subcarrier power calculator 55, and except that there are no connections from the first estimated power value calculator 44 and second estimated power value calculator 54 to the power ratio comparator 31*f*. The first subcarrier power calculator 45 and second subcarrier power calculator 55 are the same as in FIG. 5 in the second embodiment. The first OFDM demodulator 15*f* and second OFDM demodulator 25*f* in FIG. 10 have the same structure as the first OFDM demodulator 15*d* and second OFDM demodulator 25*d* in FIG. 8 in the fifth embodiment.

Next, the operation of the diversity receiver in the seventh embodiment will be described. Descriptions of structures that are the same as in the first to sixth embodiments will be omitted.

The threshold conversion table unit 32 determines a power ratio threshold value responsive to the first power control signal and the second power control signal as described in the sixth embodiment and outputs it to the power ratio comparator 31*f*.

The power ratio comparator 31*f* compares the first subcarrier power value received from the first subcarrier power calculator 45 with the second subcarrier power value received from the second subcarrier power calculator 55 and determines which of the two subcarrier power values is larger. It further compares a value obtained by dividing the larger one of the two subcarrier power values by the smaller one with the power ratio threshold value received from the threshold conversion table unit 32, and outputs a signal varying for each subcarrier responsive to the comparison result to the selective/equal gain combining selector 33.

Responsive to the signal received from the power ratio comparator 31*f*, the selective/equal gain combining selector 33 selects either selection diversity, in which either the demodulated signal from the first OFDM demodulator 15*f* or the demodulated signal from the second OFDM demodulator 25*f* is selected and output, or equal gain combining diversity, in which a demodulated signal obtained by combining the two demodulated signals from the first OFDM demodulator 15*f* and second OFDM demodulator 25*f* with equal gain is selected and output.

That is, the selective/equal gain combining selector 33 outputs, responsive to the output from the power ratio comparator 31*f*, a signal output from the first demodulator 46 alone, a signal output from the second demodulator 56 alone, or a signal obtained by combining the signals output from the first demodulator 46 and second demodulator 56 with equal gain.

Accordingly, the output of the selective/equal gain combining selector 33 is a demodulated signal obtained by adaptively selecting one of the pair of demodulated signals on the demodulation paths A, B, responsive to the power ratio of the two channel characteristic estimation values of the two received signals for each subcarrier component, or a demodulated signal obtained by combining the demodulated signals on demodulation paths A, B; the diversity effect of the two demodulation paths A and B reduces the error rate of the modulated signal.

As described above, the seventh embodiment provides a structure in which adaptive combining diversity is carried out by adaptively varying the power ratio threshold value responsive to the power levels of signals received through the antennas 11, 21, and using the varying power ratio threshold value and power values corresponding to the channel characteristic estimation results; thus it can eliminate the need for a multiplier for correcting the power values resulting from the channel estimation according to the power control signals, so the diversity combining process for each subcarrier can be carried out by a receiver with less circuitry, without a reduction of the diversity effect due to a difference between the receiving power levels. It is so structured that adaptive combining diversity is carried out using the power values of the subcarrier components after the Fourier transform, making it possible to carry out adaptive combining diversity without being affected by channel estimation error, resulting in improved receiving performance of the receiver.

EIGHTH EMBODIMENT

The diversity receiver in the seventh embodiment carries out adaptive combining diversity by adaptively varying a threshold value in the power ratio comparator responsive to the power levels of the signals received through the antennas 11, 21 and using the threshold value together with the signal power values of the subcarriers. In the diversity receiver in the eighth embodiment, in addition to the power level and the estimated power value $P_{es}$ used in the sixth embodiment, an error count obtained as a result of the correction of errors in the demodulated signals output from the first demodulator 46 and second demodulator 56 is also taken into account to carry out adaptive combining diversity, as described below.

In general, a received signal using a Reed-Solomon error correcting code requires a Reed-Solomon demodulator in the error corrector of the receiver. A Reed-Solomon demodulator performs error correction for the received signal by using parity information added to the received data packet to reproduce the received data. The received data stream is divided into blocks of a given size and parity information is inserted in each block, the data and parity information constituting a data packet with a given amount of data. The Reed-Solomon demodulator corrects errors in each data packet independently.

If the number of errors in a data packet exceeds the error correcting capability of the parity information, the Reed-Solomon demodulator becomes unable to perform error correction, but it can still count the number of data packets with errors that were uncorrectable. Accordingly, it is possible to set the Reed-Solomon demodulator to output demodulated signals and also to output the number of data packets with uncorrectable errors at regular intervals. The diversity receiver in this embodiment makes use of this count of the number of data packets with uncorrectable errors. In the following descriptions, the number of data packets with uncorrectable errors will be represented as $N_{ep}$. It will be assumed that the number of errors is the same as the number of data packets with uncorrectable errors.

Figure 11:
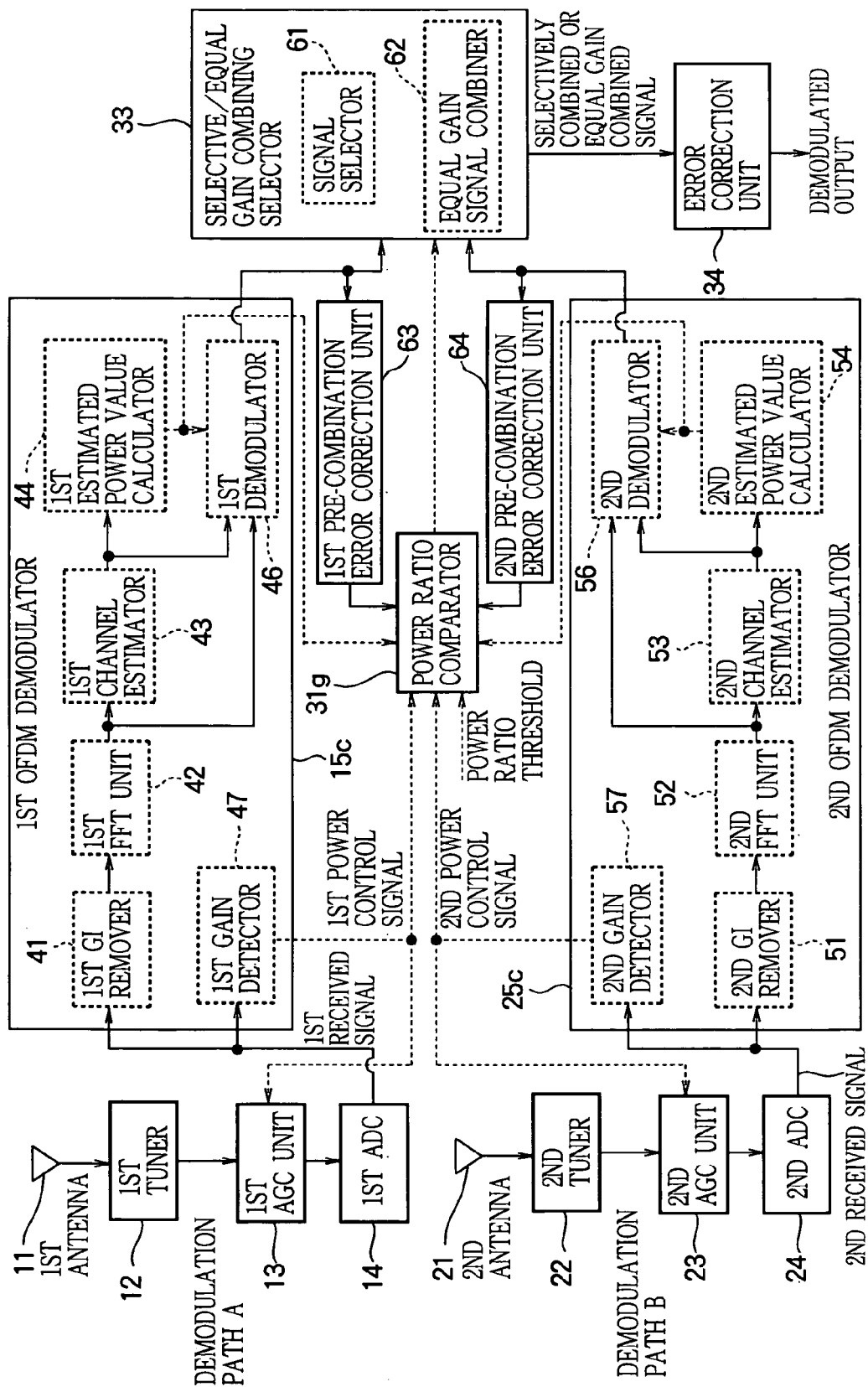
FIG. 11 is a block diagram illustrating a diversity receiver in an eighth embodiment of the invention.
Figure 12:
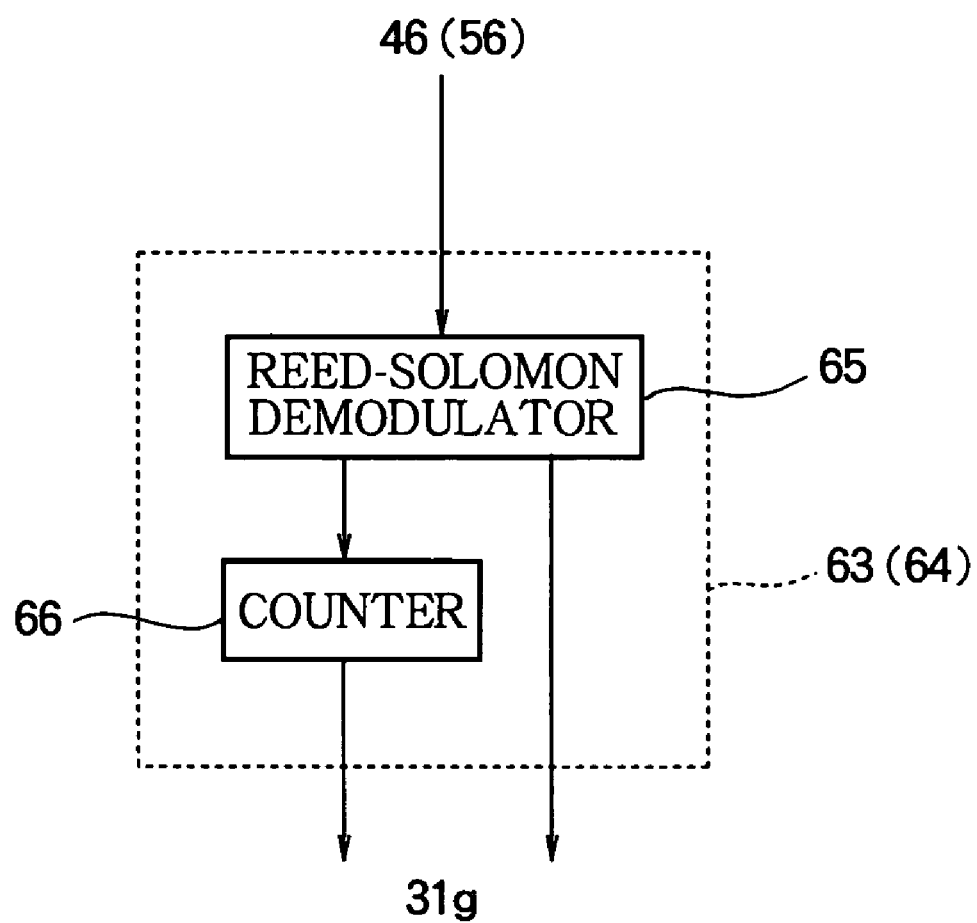
FIG. 12 is a block diagram showing the structure of the first pre-combination error correction unit in FIG. 11.

FIG. 11 is a block diagram showing a diversity receiver in the eighth embodiment. The structure of the diversity receiver in FIG. 11 is the same as shown in FIG. 9 in the sixth embodiment, except for the power ratio comparator 31g, a first pre-combination error correction unit 63, and a second pre-combination error correction unit 64, and except that there is no threshold conversion table unit. The first pre-combination error correction unit 63 and second pre-combination error correction unit 64 operate following the first demodulator 46 and second demodulator 56 so that adaptive combining diversity is carried out by using the counts of the number of data packets with uncorrectable errors. FIG. 12 is a block diagram showing the structure of the first pre-combination error correction unit 63 and second pre-combination error correction unit 64 in FIG. 11; a counter 66 in FIG. 12 counts the number of data packets with uncorrectable errors output from the Reed-Solomon demodulator 65.

The Reed-Solomon decoder 65 in the first pre-combination error correction unit 63 corrects errors in the first demodulated signal output from the first demodulator 46, and outputs a signal indicating the number of data packets with uncorrectable errors $N_{ep\_A}$ occurring in a predetermined period of time, which will be referred to as an uncorrectable error signal below. Responsive to the uncorrectable error signal, the counter 66 calculates the number $N_{ep\_A}$ of data packets with uncorrectable errors in the first demodulated signal and outputs a signal indicating the calculated result to the power ratio comparator 31g.

Similarly, the Reed-Solomon decoder 65 in the second pre-combination error correction unit 64 corrects errors in the second demodulated signal output from the second demodulator 56, and outputs an uncorrectable error signal. Responsive to the uncorrectable error signal, the counter 66 calculates the number $N_{ep\_B}$ of data packets with uncorrectable errors in the second demodulated signal and outputs a signal indicating the calculated result to the power ratio comparator 31g. In the following descriptions of the eighth embodiment, the uncorrectable error signal output from the first pre-combination error correction unit 63 will be referred to as the first uncorrectable error signal; the uncorrectable error signal output from the second pre-combination error correction unit 64 will be referred to as the second uncorrectable error signal. Similarly, the number of data packets with uncorrectable errors in the first demodulated signal $N_{ep\_A}$ will be referred to as the first number of data packets with uncorrectable errors $N_{ep\_A}$; the number of data packets with uncorrectable errors in the second demodulated signal $N_{ep\_B}$ will be referred to as the second number of data packets with uncorrectable errors $N_{ep\_B}$.

The power ratio comparator 31g receives the first power control signal output from the first gain detector 47, the second power control signal output from the second gain detector 57, the first estimated power value $P_{es\_A}$ output from the first estimated power value calculator 44, the second estimated power value $P_{es\_B}$ output from the second estimated power value calculator 54, the first uncorrectable error signal, and the second uncorrectable error signal.

A first threshold value $Th_1$ for the first power control signal and second power control signal, a second threshold value $Th_2$ for the first uncorrectable error signal and second uncorrectable error signal, and a third threshold value $Th_3$ for the first estimated power value $P_{es\_A}$ and the second estimated power value $P_{es\_B}$ are input in advance to the power ratio comparator 31g.

Figure 13:
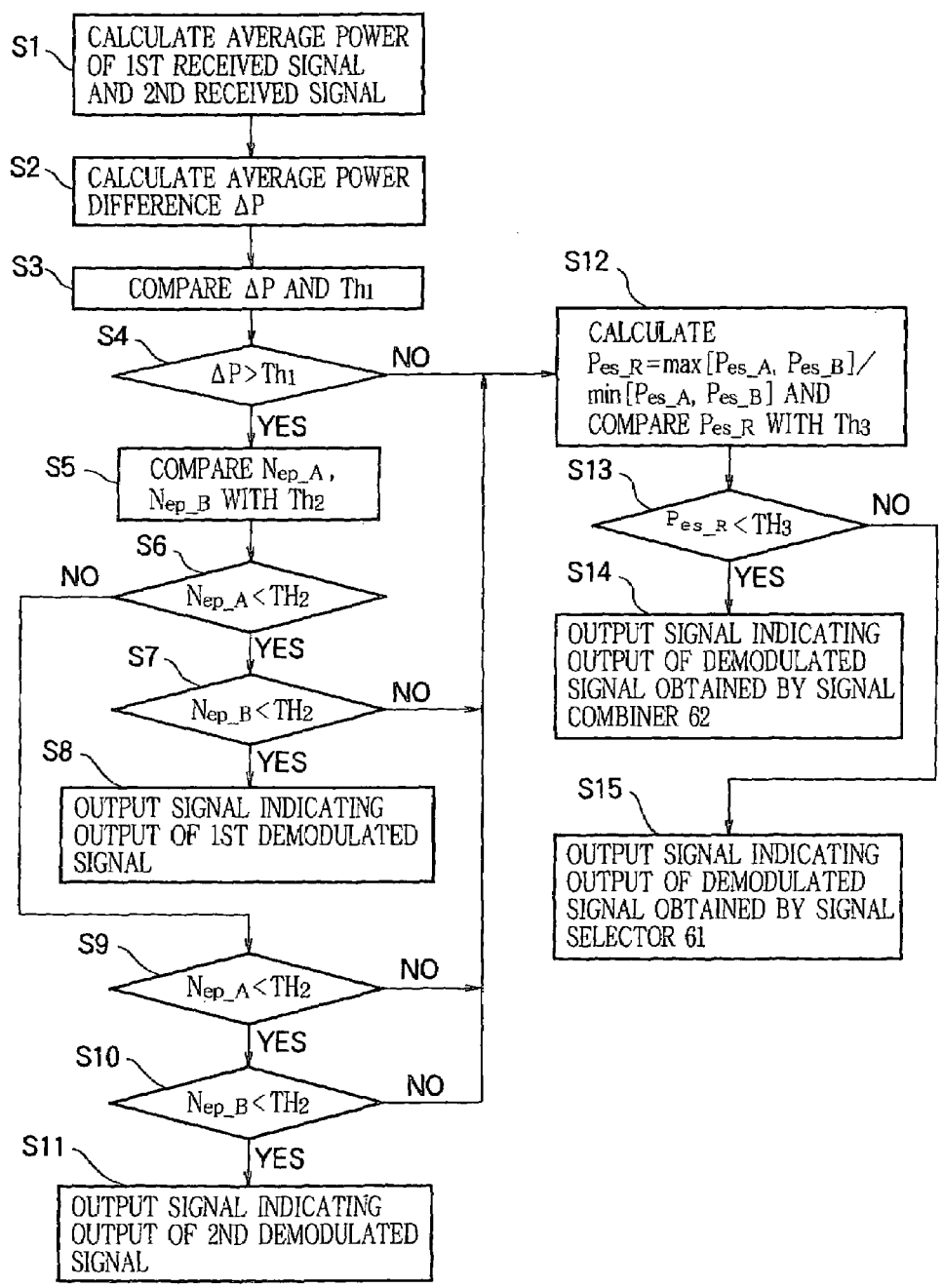
FIG. 13 is a flow diagram showing an example of the operation of the main parts of the diversity receiver in FIG. 11.

FIG. 13 is a flow-diagram showing an example of the operation of the power ratio comparator 31g in the diversity receiver in FIG. 11.

In the power ratio comparator 31g in FIG. 11, the average power value of the first received signals is calculated from the first power control signal, and the average power value of the second received signal is calculated from the second power control signal (S1). Then the difference $\Delta P$ between the two average power values is calculated (S2), and the difference $\Delta P$ is compared with the first threshold value $Th_1$ (S3).

As a result of the comparison, if the difference $\Delta P$ between the average power values is larger than the first threshold value $Th_1$ (S4: Yes), the first number of data packets with uncorrectable errors $N_{ep\_A}$, indicated by the first uncorrectable error signal, and the second number of data packet with uncorrectable errors $N_{ep\_B}$, indicated by the second uncorrectable error signal, are compared with the second threshold value $Th_2$ (S5).

If the result of step S5, is that the first number $N_{ep\_A}$ is found to be smaller than the second threshold value $Th_2$ (S6: Yes), and the second number $N_{ep\_B}$ is found to be larger than the second threshold value $Th_2$ (S7: Yes), the power ratio comparator 31g outputs a signal indicating that the first demodulated signal should be selected by the signal selector 61 in the selective/equal gain combining selector 33 (S8).

If the result of step S5 is that the first number $N_{ep\_A}$ is found to be larger than the second threshold value $Th_2$ (S6: No and S9: Yes), and the second number $N_{ep\_B}$ is found to be smaller than the second threshold value $Th_2$ (S10: Yes), the power ratio comparator 31g outputs a signal indicating that the second demodulated signal should be selected by the signal selector 61 in the selective/equal gain combining selector 33 (S11).

In other words, in steps S5 to S11, if it is determined that just one of the first number of data packets with uncorrectable errors, indicated by the first uncorrectable error signal $N_{ep\_A}$, or the second number of data packets with uncorrectable errors, indicated by the second uncorrectable error signal $N_{ep\_B}$, is larger than the second threshold value $Th_2$, a signal is output from the power ratio comparator 31g to the selective/equal gain combining selector 33 indicating that the demodulated signal in which the number of data packets with uncorrectable errors is smaller than the second threshold value $Th_2$ is to be output.

In other cases, that is, if the difference $\Delta P$ between the average power values is smaller than the first threshold value $Th_1$ (S4: No), if both the first number of data packets with uncorrectable errors $N_{es\_A}$ and the second number of data packets with uncorrectable errors $N_{es\_B}$ are smaller than the second threshold value $Th_2$ (S7: No), or if both the first number of data packets with uncorrectable errors $N_{es\_A}$ and the second number of data packets with uncorrectable errors $N_{es\_B}$ are larger than the second threshold value $Th_2$ (S10: No), the power ratio comparator 31g determines the estimated power ratio $P_{es\_R}$ from the first estimated power value $P_{es\_A}$ and the second estimated power value $P_{es\_B}$, as represented by equation 7 below.

$$P_{es\_R} = \frac{\max[P_{es\_A}, P_{es\_B}]}{\min[P_{es\_A}, P_{es\_B}]} \quad (7)$$

In equation 7, max[X1, X2] is a function for selecting and outputting the larger one of X1 and X2; min[X1, X2] is a function for selecting and outputting the smaller one of X1 and X2.

In this specific case, for example, the power ratio comparator 31g determines which of the first estimated power value $P_{es\_A}$ and the second estimated power value $P_{es\_B}$ is larger, and obtains the estimated power ratio $P_{es\_R}$ by dividing the larger one of the estimated power values by the smaller one. The power ratio comparator 31g further compares the obtained estimated power ratio $P_{es\_R}$ with the third threshold value $Th_3$ (S12).

If the result of the comparison in step S12 is that the estimated power ratio $P_{es\_R}$ is smaller than the third threshold value $Th_3$ (S13: Yes), the power ratio comparator 31g outputs to the selective/equal gain combining selector 33 a signal indicating that the combined demodulated signal obtained in the equal-gain signal combiner 62 is to be output for each subcarrier (S14).

If the result of the comparison in Step 12 is that the estimated power ratio $P_{es\_R}$ is larger than the third threshold value $Th_3$ (S13: No), the power ratio comparator 31g outputs to the selective/equal gain combining selector 33 a signal indicating that the selected demodulated signal obtained in the signal selector 61 is to be output for each subcarrier (S15).

Responsive to the signal received from the power ratio comparator 31g, the selective/equal gain combining selector 33 outputs the demodulated signal obtained in the signal selector 61 or the equal-gain signal combiner 62 to the error correction unit 34.

As described above, the eighth embodiment provides a structure in which adaptive combining diversity is carried out responsive to the number of data packets with uncorrectable errors obtained from error correction of the demodulated signals output from the first demodulator 46 and the second demodulator 56, so the diversity combining process for each subcarrier can be carried out by a receiver with less circuitry, without a reduction of the diversity effect due to a difference between the received power levels.

NINTH EMBODIMENT

The diversity receiver in the eighth embodiment carries out adaptive combining diversity by taking account of the number of errors found by error correction of the demodulated signals output from the first demodulator 46 and second demodulator 56, in addition to the power levels and estimated power values $P_{es\_A}$, $P_{es\_B}$. The diversity receiver in the ninth embodiment carries out adaptive combining diversity by using, in addition to the power levels and estimated power values $P_{es\_A}$, $P_{es\_B}$, the number of errors (number of data packets with uncorrectable errors) found by error correction of either the first demodulated signal output from the first demodulator 46 or the second demodulated signal output from the second demodulator 56, and the number of errors (number of data packets with uncorrectable errors) found by error correction of the signal output from the selective/equal gain combining selector 33, as described below.

Figure 14:
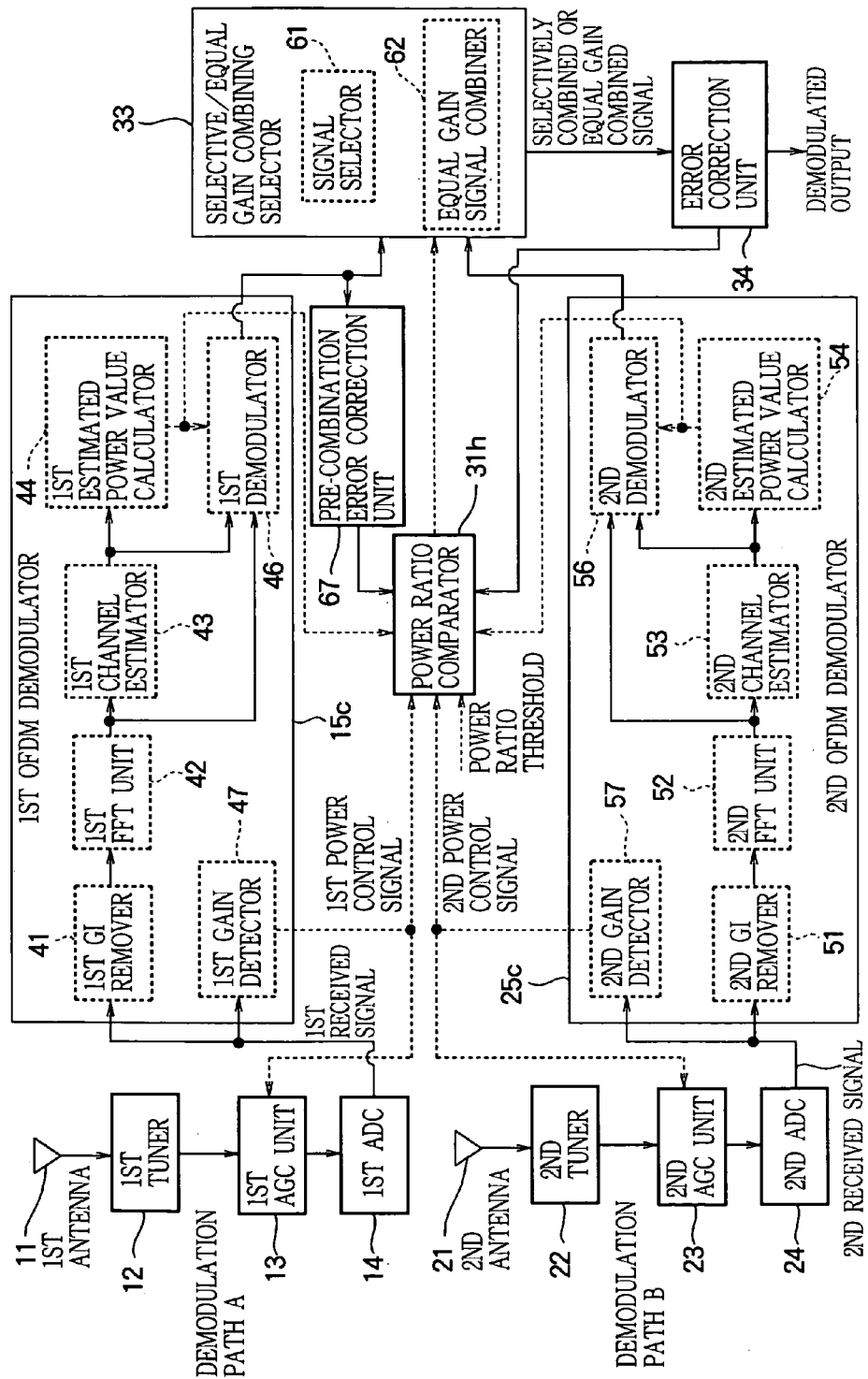
FIG. 14 is a block diagram illustrating a diversity receiver in a ninth embodiment of the invention.

FIG. 14 is a block diagram showing the structure of a diversity receiver in the ninth embodiment. The structure of the pre-combination error correction unit 67 and the error correction unit 34 in FIG. 14 may be the same as the structure of the first pre-combination error correction unit 63 and second pre-combination error correction unit 64 in FIG. 12 in the eighth embodiment. In the descriptions below, descriptions of structures that are the same as in the first to eighth embodiments will be omitted.

The pre-combination error correction unit 67 performs error correction of the first demodulated signal output from the first demodulator 46, and outputs to the power ratio comparator 31h a third uncorrectable error signal indicating a third number of data packets with uncorrectable errors $N_{ep\_pre}$ obtained in a predetermined period of time. The error correction unit 34 performs error correction of the selectively combined or equal gain combined signal, and outputs to the power ratio comparator 31h a fourth uncorrectable error signal indicating a fourth number of data packets with uncorrectable errors $N_{ep\_f}$.

The power ratio comparator 31h receives the first power control signal output from the first gain detector 47, the second power control signal output from the second gain detector 57, the first estimated power value output from the first-estimated power value calculator 44, the second estimated power value output from the second estimated power value calculator 54, the third uncorrectable error signal output from the pre-combination error correction unit 67, and the fourth uncorrectable error signal output from the error correction unit 34.

A first threshold value $Th_1$ for the first power control signal and the second power control signal, a fourth threshold value $Th_4$ for the third uncorrectable error signal, a fifth threshold value $Th_5$ for the fourth uncorrectable error signal, and a sixth threshold value $Th_6$ for the first estimated power value and the second estimated power value are input in advance to the power ratio comparator 31h.

Figure 15:
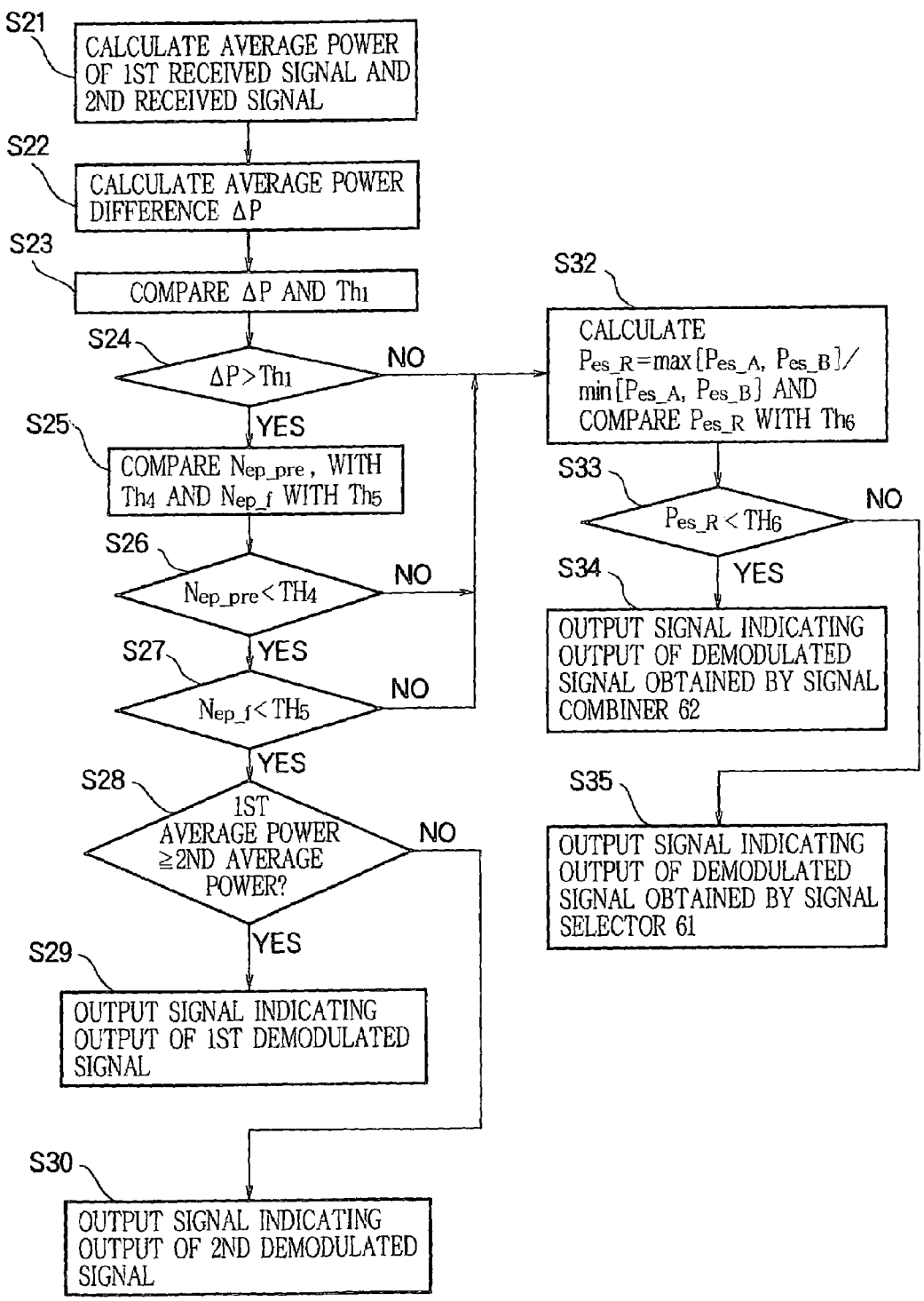
FIG. 15 is a flow diagram showing an example of the operation of the main parts of the diversity receiver in FIG. 14.

FIG. 15 is a flow diagram showing an example of the operation of the power ratio comparator 31h of the diversity receiver in FIG. 14.

The power ratio comparator 31h in FIG. 14 calculates the average power value of the first received signal from the input first power control signal and the average power value of the second received signal from the second power control signal (S21), calculates the difference ΔP between the two average power values (S22), and compares the difference ΔP with the first threshold value $Th_1$ (S23).

As a result of the comparison, if the difference ΔP between the average power values is larger than the first threshold value $Th_1$ (S24: Yes), the power ratio comparator 31h compares the third number of data packets having uncorrectable errors $N_{ep\_pre}$ indicated by the third uncorrectable error signal with the fourth threshold value $Th_4$, and compares the fourth number of data packets having uncorrectable errors $N_{ep\_B}$ indicated by the fourth uncorrectable error signal with the fifth threshold value $Th_5$ (S25).

If the result of step S25 is that the third number of data packets having uncorrectable errors $N_{ep\_pre}$ indicated by the third uncorrectable error signal is found to be smaller than the fourth threshold value $Th_4$ (S26: Yes), and the forth number of data packets having uncorrectable errors $N_{ep\_f}$ indicated by the fourth uncorrectable error signal is found to be larger than the fifth threshold value $Th_5$ (S27: Yes) the power ratio comparator 31h compares the average power values of the first and second received signals obtained in step S21 and determines which average power value is the larger (S28).

If the result of step S28 is that the first average power is larger than the second average power (S28: Yes), the power ratio comparator 31h outputs a signal indicating that the first demodulated signal should be selected by the signal selector 61 in the selective/equal gain combining selector 33 and the first demodulated signal should be output from the selective/equal gain combining selector 33 (S29) If the result of step S28 is that the first average power value is smaller than the second average power value (S28: No), the power ratio comparator 31h outputs a signal indicating that the second demodulated signal should be selected by the signal selector 61 in the selective/equal gain combining selector 33 and should be output from the selective/equal gain combining selector 33 (S30).

In other words, in steps S25 to S30, if it is determined that the third number of data packets with uncorrectable errors indicated by the third uncorrectable error signal is smaller than the fourth threshold value $Th_4$ and the fourth number of data packets with uncorrectable errors indicated by the fourth uncorrectable error signal is larger than the fifth threshold value $Th_5$, the power ratio comparator 31h selects the larger of the average power values, and a signal is output from the power ratio comparator 31h to the selective/equal gain combining selector 33, indicating that the demodulated signal, on either demodulation path A or B, with the selected average power value is to be selected and output.

In other cases, that is, if the difference $\Delta P$ between the average power values is smaller than the first threshold value $Th_1$ (S24: No), if the third number of data packets with uncorrectable errors $N_{ep\_pre}$ is equal to or larger than the fourth threshold value $Th_4$ (S26: No), or if the fourth number of data packets with uncorrectable errors $N_{ep\_f}$ is equal to or less than the fifth threshold value $Th_5$ (S27: No), the power ratio comparator 31h determines the estimated power ratio $P_{es\_R}$ from the first estimated power value $P_{es\_A}$ and the second estimated power value $P_{es\_B}$ as in equation 7 in the eighth embodiment, and compares the estimated power ratio $P_{es\_R}$ with the sixth threshold value $Th_6$ (S32).

If the result of the comparison in step S32 is that the estimated power ratio $P_{es\_R}$ is found to be smaller than the sixth threshold value $Th_6$ (S33: Yes), a signal is output from the power ratio comparator 31h to the selective/equal gain combining selector 33, indicating that the demodulated signal obtained in the equal-gain signal combiner 62 should be output (S34).

For each subcarrier, if the result of the comparison in step S32 is that the estimated power ratio $P_{es\_R}$ is larger than the sixth threshold value $Th_6$ (S33: No), the power ratio comparator 31h outputs to the selective/equal gain combining selector 33 a signal indicating that the demodulated signal obtained in the signal selector 61 is to be output (S35). Responsive to the signal received from the power ratio comparator 31h, the selective/equal gain combining selector 33 outputs the demodulated signal obtained in the signal selector 61 or the equal-gain signal combiner 62 to the error correction unit 34.

As described above, the ninth embodiment provides a structure in which adaptive combining diversity is carried out by using a third number of data packets with uncorrectable errors obtained from the result of error correction in either the first demodulated signal or the second demodulated signal and a fourth number of data packets with uncorrectable errors obtained from the result of error correction of the signal output from the selective/equal gain combining selector 33, in addition to the power levels and the estimated power ratio $P_{es}$, so a diversity combining process responsive to the number of errors on the demodulation paths A and B for each subcarrier can be carried out by a receiver with less circuitry, without a reduction of the diversity effect due to a difference between the received power levels.

In the eighth and ninth embodiments, the diversity process utilizes the number of data packets with uncorrectable errors, but it is also possible to use, together with the number of data packets with uncorrectable errors, an uncorrectable error packet ratio (also referred to as an error rate) obtained by dividing the number of data packets with uncorrectable errors by the number of data packets received in the predetermined period of time.

The first to ninth embodiments have a structure with two demodulation paths, but the invention is not limited to two demodulation paths: the structure can be easily adapted to the case in which switching between selection diversity and equal gain combining diversity is carried out in a diversity receiver with three or more demodulation paths.

In the third to ninth embodiments, the first gain detector 47 and the second gain detector 57 are disposed in the first OFDM demodulator and the second OFDM demodulator, respectively, but they may be disposed outside the two OFDM demodulators.

INDUSTRIAL APPLICABILITY

As described above, the diversity receiving method of the present invention is adapted to switch adaptively between selection diversity and equal gain combining diversity for each subcarrier responsive to the power of the received signals on each of the demodulation paths, so in comparison with conventional diversity receiving methods that perform only selection or only equal gain combining, the diversity effect can be increased and receiving performance can be improved, while in comparison with the practice of maximal ratio combining diversity, a diversity receiver with a large diversity effect can be implemented in less circuitry.

What is claimed is:

1. A diversity receiver comprising:
   a plurality of demodulation paths for demodulating received signals and outputting demodulated signals;
   a power ratio comparator for calculating a power ratio from a first power corresponding to a first received signal on one of the demodulation paths and a second power corresponding to a second received signal on another one of the demodulation paths, and comparing the power ratio with a predetermined threshold value;
   a signal selector for selecting one of the demodulated signals output from the plurality of demodulation paths and outputting the selected demodulated signal;
   an equal-gain signal combiner for combining the demodulated signals output from the plurality of demodulation paths with predetermined gains, and outputting a combined demodulated signal;
   a demodulated signal output unit for outputting one of the demodulated signals, either the selected demodulated signal or the combined demodulated signal, responsive to a result of the comparison in the power ratio comparator; and an estimated power value calculator that outputs, as said first power, an estimated power value obtained from the result of channel characteristic estimation using a reference signal contained in the first received signal.

2. The diversity receiver of claim 1, wherein the received signals include a plurality of subcarrier components, and the demodulated signal output unit outputs one of the demodulated signals, either the selected demodulated signal or the combined demodulated signal, for each subcarrier component.

3. The diversity receiver of claim 1, wherein the threshold value used in the power ratio comparator is determined from a condition that the received-power-to-noise-power ratio value of the demodulated signal obtained by combining the plurality of demodulated signals with equal gain equals a maximum received-power-to-noise-power ratio among the received-power-to-noise-power ratios of the plurality of demodulated signals.

4. The diversity receiver of claim 3, wherein the demodulated signal output unit outputs either the demodulated signal obtained by combining the plurality of demodulated signals with equal gain or the selected demodulated signal responsive to the power ratio and the threshold value determined under said condition.

5. The diversity receiver of claim 3, wherein the signal selector selects a demodulated signal with a maximum received-power-to-noise-power ratio among the received-power-to-noise-power ratios of the demodulated signals output from the demodulation paths.

6. The diversity receiver of claim 1, wherein:
the first received signal is an orthogonal frequency division multiplexing (OFDM) signal modulated by an OFDM modulation system; and
the estimated power value calculator uses a pilot signal included in the OFDM signal as the reference signal.

7. The diversity receiver of claim 1, wherein the first received signal is an OFDM signal modulated by an OFDM modulation system, further comprising:
a subcarrier power calculator that outputs a subcarrier power of a subcarrier component obtained by a Fourier transform of The OFDM signal, as said first power.

8. The diversity receiver of claim 1, further comprising a gain detector that outputs a power control signal corresponding to a gain adjustment quantity for adjusting said first power to a predetermined power level.

9. The diversity receiver of claim 8, further comprising an estimated power value calculator That outputs an estimated power value corresponding to a result of channel characteristic estimation using a reference signal contained in the first received signal as said first power, wherein:
the power ratio comparator performs the comparison by using a result of multiplication of the estimated power value by a coefficient determined by the gain adjustment quantity.

10. The diversity receiver of claim 9, further comprising:
a subcarrier power
calculator that outputs a subcarrier power of a subcarrier component obtained by a Fourier transform of the first received signal, the first received signal being an OFDM signal, wherein:
the power ratio comparator uses a result of multiplication of the subcarrier power value by a coefficient determined by the gain adjustment quantity as the first power.

11. The diversity receiver of claim 9, Thither comprising a threshold conversion table unit that prestores, and outputs to the power ratio comparator, a threshold value corresponding to the gain adjustment quantity.

12. A diversity receiver, comprising:
a plurality of demodulation paths for demodulating received signals and outputting demodulated signals;
a power ratio comparator for calculating a power ratio from a first power corresponding to a fast received signal on one of the demodulation paths and a second power corresponding to a second received signal on another one of the demodulation paths, and comparing the power ratio with a predetermined threshold value;
a signal selector for selecting one of the demodulated signals output from the plurality of demodulation pats and outputting the selected demodulated signal;
an equal-gain signal combiner for combining the demodulated signals output from the plurality of demodulation paths with predetermined gains, and outputting a combined demodulated signal; and
a demodulated signal output unit for outputting one of the demodulated signals, either the selected demodulated signal or the combined demodulated signal, responsive to a result of the comparison in the power ratio comparator;
a gain detector that outputs a power control signal corresponding to a gain adjustment quantity for adjusting said first power to a predetermined power level;
an estimated power value calculator that outputs an estimated power corresponding to a result of channel characteristic estimation using a reference signal contained in the first received signal; and
a pre-combination error correction unit that outputs a number of errors or an error rate obtained as a result of error correction of the demodulated signal output from said one of the demodulation paths before it is input to the demodulated signal output unit; wherein
the power ratio comparator uses the power control signal., the estimated power, and said number of errors or said error rate in comparing the power ratio with the predetermined threshold value.

13. A diversity receiver, comprising:
a plurality of demodulation paths for demodulating received signals and outputting demodulated signals;
a power ratio comparator for calculating a power ratio from a first power corresponding to a first received signal on one of the demodulation paths and a second power corresponding to a second received signal on another one of the demodulation pats, and comparing the power ratio with a predetermined threshold value;
a signal selector for selecting one of the demodulated signals output from the plurality of demodulation paths and outputting the selected demodulated signal;
an equal-gain signal combiner for combining the demodulated signals output from the plurality of demodulation paths with predetermined gains, and outputting a combined demodulated signal; and
a demodulated signal output unit for outputting one of the demodulated signals, either the selected demodulated signal or the combined demodulated signal, responsive to a result of the comparison in the power ratio comparator;
a gain detector that outputs a power control signal corresponding to a gain adjustment quantity for adjusting said first power to a predetermined power level;
an estimated power value calculator that outputs an estimated power corresponding to a result of channel characteristic estimation using a reference signal contained in the first received signal, as said first power;

a pre-combination error correction unit that outputs a number of errors or an error rate obtained as a result of error correction of the demodulated signal output from said one of the demodulation paths before it is input to the demodulated signal output unit; and an error correction unit that outputs a number of errors or an error rate obtained as a result of error correction of the demodulated signal output from the demodulated signal output unit; wherein the power ratio comparator uses the power control signal, the estimated power, the number of errors or the error rate output from the pre-combination error correction unit, and the number of errors or the error rate output from the error correction unit in comparing the power ratio with the predetermined threshold value.

14. A diversity receiving method including a plurality of demodulating processes for demodulating a received signal and outputting a demodulated signal, comprising the steps of:

calculating a power ratio from a first power corresponding to a first received signal in one of the demodulation processes and a second power corresponding to a second received signal in another one of the demodulation processes, and comparing the power ratio with a first predetermined threshold value;

counting pre-combination errors to determine a first error rate of the first received signal in said one of the demodulation processes and a second error rate of the second received signal in said another one of the demodulation processes, and comparing the first error rate and the second error rate with a second predetermined threshold value;

selecting one of the demodulated signals output from the plurality of demodulation processes and outputting the selected demodulated signal;

combining the demodulated signals output from the plurality of demodulation paths with predetermined gains, and outputting a combined demodulated signal; and outputting one of the demodulated signals, either the selected demodulated signal or the combined demodulated signal, responsive to a result of the comparison in the step of calculating and results of the comparisons in the step of counting pre-combination errors.

15. The diversity receiving method of claim 14, further comprising:

counting output errors in the output one of the demodulated signals to determine a third error rate of the demodulated signal; and comparing the third error rate with a third predetermined threshold value;

wherein the outputting of said one of the demodulated signals is also responsive to a result of the comparison performed in the step of comparing the third error rate.

16. A diversity receiver comprising:

a plurality of demodulation paths for demodulating received signals and outputting demodulated signals;

a power ratio comparator for calculating a power ratio from a first power corresponding to a first received signal on one of the demodulation paths and a second power corresponding to a second received signal on another one of the demodulation paths, and comparing the power ratio with a predetermined threshold value;

a pre-combination error correction unit that outputs a number of errors or an error rate obtained as a result of error correction of the demodulated signal output from said one of the demodulation paths before it is input to the demodulated signal output unit;

a signal selector for selecting one of the demodulated signals output from the plurality of demodulation paths and outputting the selected demodulated signal;

an equal-gain signal combiner for combining the demodulated signals output from the plurality of demodulation paths with predetermined gains, and outputting a combined demodulated signal; and a demodulated signal output unit for outputting one of the demodulated signals, either the selected demodulated signal or the combined demodulated signal, responsive to a result of the comparison in the power ratio comparator and the number of errors or error rate obtained by the pre-combination error correction unit.

17. The diversity receiver of claim 16, further comprising:

an error correction unit tat outputs a number of errors or an error rate obtained as a result of error correction of the demodulated signal output from the demodulated signal output unit; wherein the outputting of the one of the demodulated signals in the demodulated signal output unit is also responsive to the number of errors or error rate obtained by the error correction unit.

* * * * *